(12) United States Patent
Hyodo et al.

(10) Patent No.: US 6,253,743 B1
(45) Date of Patent: Jul. 3, 2001

(54) FUEL VAPOR CONTROL APPARATUS

(75) Inventors: Yoshihiko Hyodo, Gotenba; Toshimi Murai; Hidekazu Sasaki, both of Susono; Koichi Takeuchi, Toyota, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/368,474

(22) Filed: Aug. 4, 1999

(30) Foreign Application Priority Data

Aug. 21, 1998 (JP) .................................. 10-235875

(51) Int. Cl.$^7$ .................................................. F02M 33/02
(52) U.S. Cl. ............................................ 123/520; 123/557
(58) Field of Search ..................................... 123/520, 518, 123/519, 521, 522, 523, 524, 557

(56) References Cited

U.S. PATENT DOCUMENTS

| | | | |
|---|---|---|---|
| 2,757,744 | * 8/1956 | Malone | 169/47 |
| 3,692,823 | * 9/1972 | Gordon | 560/243 |
| 3,800,768 | * 4/1974 | Rhodes et al. | 123/522 |
| 4,312,317 | * 1/1982 | Jewett et al. | 123/522 |
| 4,356,805 | * 11/1982 | Kler | 123/557 |
| 4,368,712 | * 1/1983 | Jackson et al. | 123/523 |
| 5,085,198 | * 2/1992 | Bartlett et al. | 123/510 |
| 5,197,442 | * 3/1993 | Wild et al. . | |
| 5,197,445 | * 3/1993 | Casari | 123/514 |
| 5,224,550 | * 7/1993 | Bragg | 169/62 |
| 5,560,346 | * 10/1996 | Isobe et al. . | |
| 5,878,727 | * 3/1999 | Huls | 123/520 |
| 5,884,609 | * 3/1999 | Kawamoto et al. | 123/520 |
| 5,921,222 | * 7/1999 | Freeland | 123/520 |
| 5,931,141 | * 8/1999 | Chino | 123/520 |
| 5,970,957 | * 10/1999 | Fried et al. | 123/516 |

FOREIGN PATENT DOCUMENTS

| | | |
|---|---|---|
| 90 01 091 U1 | * 4/1990 | (DE) . |
| 6-147029 | * 5/1994 | (JP) . |
| 7-132738 | * 5/1995 | (JP) . |
| 8-170568 | * 7/1996 | (JP) . |
| 9-5140 | * 1/1997 | (JP) . |
| WO99/61108 A1 | * 12/1999 | (WO) . |

* cited by examiner

*Primary Examiner*—Carl S. Miller
(74) *Attorney, Agent, or Firm*—Kenyon & Kenyon

(57) ABSTRACT

A fuel vapor control apparatus determines whether the concentration of fuel vapor in a space above the surface of liquid fuel in the fuel tank is less than a predetermined concentration. When the concentration of fuel vapor is less than the predetermined concentration, the concentration of fuel vapor in the fuel tank is increased and, when the concentration of fuel vapor exceeds the predetermined concentration, the increase of the concentration of fuel vapor is stopped. Therefore, an amount of fuel flowing out of the fuel tank can be reduced while using a reduced amount of energy.

21 Claims, 12 Drawing Sheets

FUEL VAPOR CONTROL APPARATUS

INCORPORATION BY REFERENCE

The disclosure of Japanese Patent Application No. HEI 10-235875 filed on Aug. 21, 1998 including the specification, drawings and abstract is incorporated herein by reference in its entirety.

BACKGROUND OF THE INVENTION

1. Field of the invention

The present invention relates to a fuel vapor control apparatus for restraining fuel vapor from flowing out of a fuel tank.

2. Description of the Related Art

Fuel vaporization is promoted in a fuel tank when a space containing a relatively large amount of air exists over a surface of liquid fuel in the fuel tank. The fuel tank is connected to the atmosphere to allow the surface of liquid fuel to readily lower as fuel in the fuel tank is consumed. Therefore, fuel vaporizes in the fuel tank and fuel vapor flows out into the atmosphere, which is environmentally unfavorable. A related-art technology for reducing an amount of fuel vapor that flows out of the fuel tank into the atmosphere by cooling the fuel vapor to liquefy it and return it to the fuel tank is disclosed in, for example, Japanese Patent Application Laid-open No. HEI 6-147029.

In the technology disclosed in Japanese Patent Application Laid-open No. HEI 6-147029, the amount of fuel vapor is temporarily reduced by cooling fuel vapor extracted from the fuel tank to condense and return it to the fuel tank. However, corresponding to the reduced amount of fuel vapor, fuel vapor is generated in the fuel tank, and again flows out of the fuel tank. Therefore, it is necessary to control fuel vaporization in the fuel tank in order to restrain the outflow of fuel vapor from the fuel tank. Since fuel more readily vaporizes as the temperature in the fuel tank becomes higher, the fuel tank temperature needs to be kept low in order to restrain fuel vaporization. Therefore, in order to restrain fuel vaporization in a conventional fuel tank, energy is needed in large quantities to maintain low temperatures in the fuel tank.

SUMMARY OF THE INVENTION

Accordingly, it is an object of the present invention to reduce the amount of fuel vapor that flows out of a fuel tank while requiring a reduced amount of energy.

In accordance with the invention, a fuel vapor control apparatus includes a fuel tank, a detector that detects a quantity of state corresponding to a concentration of fuel vapor in a space defined above a surface of liquid fuel in the fuel tank, a fuel vapor concentration determining device that determines whether a concentration of fuel vapor determined based on the quantity of state is less than a predetermined concentration, and a fuel vapor concentration increasing device that increases the concentration of fuel vapor when the fuel vapor concentration determining device determines that the concentration of fuel vapor is less than the predetermined concentration. Therefore, the concentration of fuel vapor in the fuel tank is kept higher than the predetermined concentration. Therefore, the pressure in the fuel tank when the fuel vapor concentration is higher than the predetermined concentration is lower than the pressure in the fuel tank when the fuel vapor concentration is lower than the predetermined concentration, provided that the temperature in the fuel tank remains unchanged. Hence, the possibility of outflow of fuel vapor from the fuel tank is small.

In the fuel vapor control apparatus of the invention, the fuel vapor concentration increasing device may stop increasing the concentration of fuel vapor when the fuel vapor concentration determining device determines that the concentration of fuel vapor exceeds the predetermined concentration.

The fuel vapor apparatus may further include a connection state controller that controls a state of connection between an inside of the fuel tank and an outside of the fuel tank, wherein when the fuel vapor concentration determining device determines that the concentration of fuel vapor is less than the predetermined concentration, the fuel vapor concentration increasing device increases the concentration of fuel vapor and causes air in the gas to flow from the inside of the fuel tank into the outside of the fuel tank via the connection state controller, and when the fuel vapor concentration determining device determines that the concentration of fuel vapor exceeds the predetermined concentration, the fuel vapor concentration increasing device stops increasing the concentration of fuel vapor and stops air from flowing out via the connection state controller.

The fuel vapor control apparatus may further have a construction as follows. That is, the detector may detect a pressure in the fuel tank as a quantity of state corresponding to the concentration of fuel vapor in the fuel tank. If the pressure in the fuel tank detected by the detector is higher than a predetermined pressure, the fuel vapor concentration determining device determines that the concentration of fuel vapor is less than the predetermined concentration. In another possible construction, the detector detects a fuel tank temperature as a quantity of state corresponding to the concentration of fuel vapor. If the fuel tank temperature detected by the detector is lower than a predetermined temperature, the fuel vapor concentration determining device determines that the concentration of fuel vapor is less than the predetermined concentration.

The fuel vapor concentration increasing device may include a heater device that heats fuel in the fuel tank. By using the heater device, the fuel vapor concentration can be increased. The heater device may include a fuel pump that supplies fuel from the fuel tank into an internal combustion engine. By using the fuel pump, the fuel vapor concentration can be increased.

BRIEF DESCRIPTION OF THE DRAWINGS

The foregoing and further objects, features and advantages of the present invention will become apparent from the following description of preferred embodiments with reference to the accompanying drawings, wherein like numerals are used to represent like elements and wherein.

DETAILED DESCRIPTION OF PREFERRED EMBODIMENTS

Figure 1:
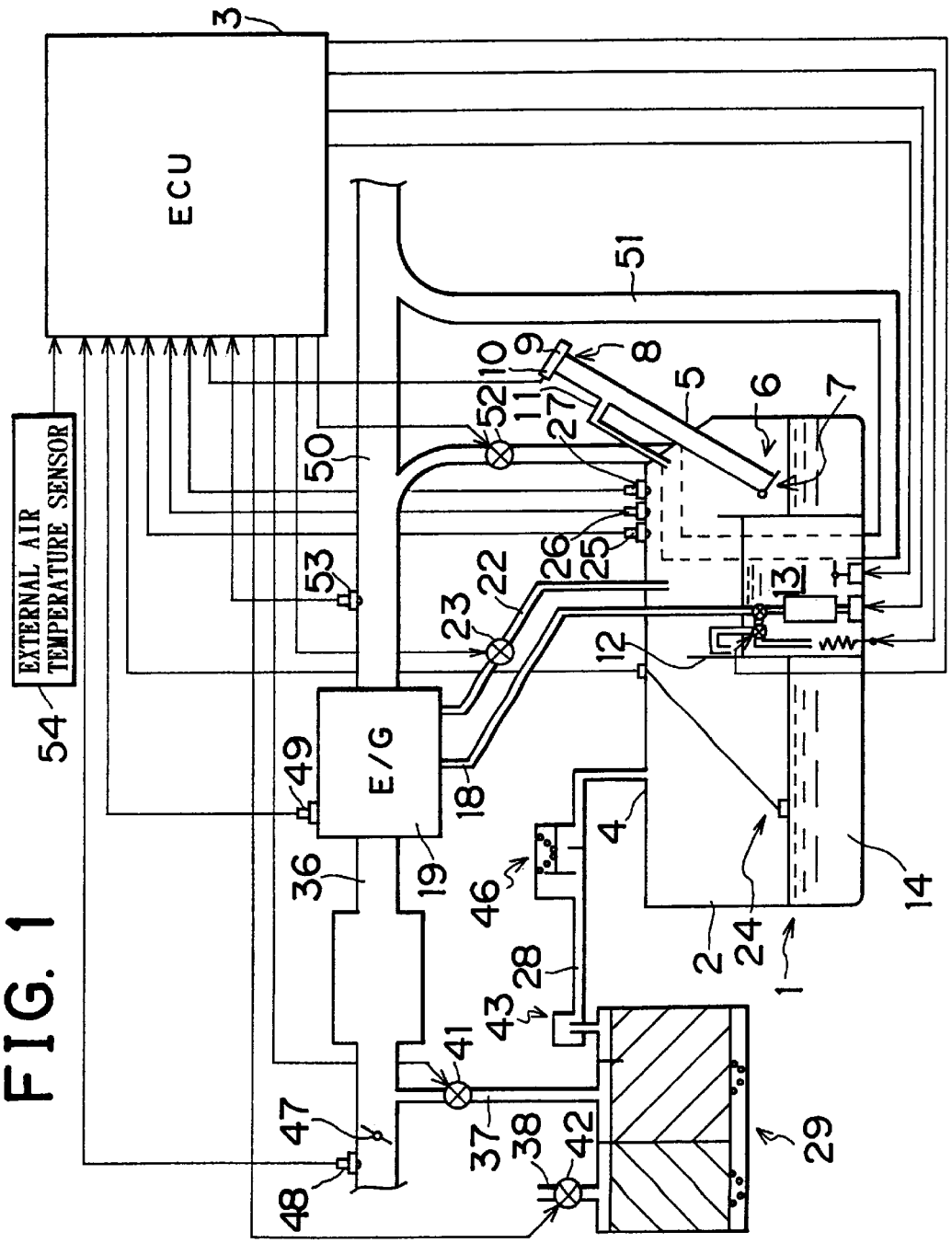
FIG. 1 is a diagram of a fuel tank equipped with a fuel vapor control apparatus according to a first embodiment of the invention.

Preferred embodiments of the present invention will be described in detail hereinafter with reference to the accompanying drawings. Referring to FIG. 1, a fuel tank 1 equipped with a fuel vapor control apparatus according to a first embodiment of the invention defines therein a fuel chamber 2. An electronic control unit (ECU) 3 receives signals from various sensors described below and, based on the signals, controls the operations of various component elements of the fuel vapor control apparatus of the first embodiment.

A fuel supply pipe 5 for supplying fuel into the fuel tank 1 is connected to an upper wall 4 of the fuel tank 1. A lower end opening (hereinafter, referred to as "lower opening") 6 of the fuel supply pipe 5 opens into the fuel tank 1. The lower opening 6 of the fuel supply pipe 5 is provided with a check valve 7. The check valve 7 is urged by a spring (not shown) in such a manner that the check valve 7 can be opened by a flow of fuel through the fuel supply pipe 5 into an interior of the fuel tank 1. When the supply of fuel into the fuel tank 1 is discontinued, the check valve 7 is closed by the pressure of fuel in the fuel tank 1 and the force of the spring. An upper end opening 8 (hereinafter, upper opening 8) of the fuel supply pipe 5 opens to the outside of the fuel tank 1. The upper opening 8 is closed by a cap 9 which is removed when fuel is to be supplied to the fuel tank 1. The cap 9 is provided with an open-close sensor 10 that outputs a signal when the cap 9 is removed from the upper opening 8 of the fuel supply pipe 5. The open-close sensor 10 is connected to the ECU 3. When the cap 9 is removed from the upper opening 8, the open-close sensor 10 sends an output signal to the ECU 3. A recirculating pipe 11 extends from a portion of the fuel supply pipe 5 between the upper opening 8 and the lower opening 6 to an upper space in the fuel tank 1. When fuel is supplied into the fuel tank 1 through the fuel supply pipe 5, the recirculating pipe 11 conducts gas from the space above the surface of liquid fuel in the fuel tank 1 into the fuel supply pipe 5 to allow the surface of liquid fuel in the fuel tank 1 to rise easily. The gas in the space above the surface of liquid fuel contains air and fuel vapor.

Inside the fuel chamber 2, an auxiliary fuel chamber 13 and a main fuel chamber 14 are formed, divided by a partition 12. A space above the auxiliary fuel chamber 13 is in connection with a space above the main fuel chamber 14. Therefore, gas is allowed to flow between the space above the surface of liquid fuel in the auxiliary fuel chamber 13 and the space above the surface of liquid fuel in the main fuel chamber 14. Although not shown in FIG. 1, a lower space in the auxiliary fuel chamber 13 is connected to a lower space in the main fuel chamber 14. Therefore, fuel is allowed to flow from the main fuel chamber 14 into the auxiliary fuel chamber 13.

Figure 2:
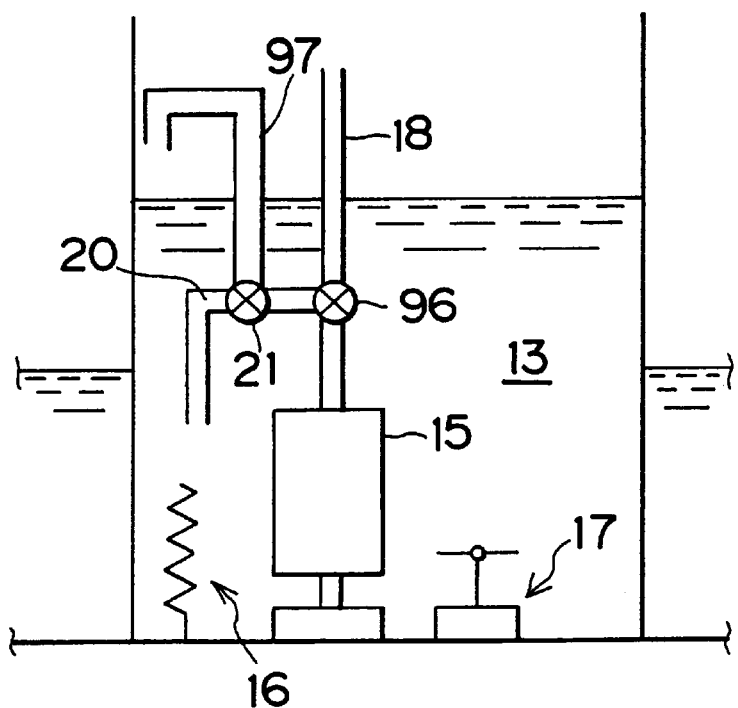
FIG. 2 is a diagram illustrating an auxiliary fuel chamber in the first embodiment.

As shown in detail in FIG. 2, the auxiliary fuel chamber 13 has therein a fuel pump 15 for supplying fuel from the auxiliary fuel chamber 13 to fuel injection valves (not shown) of an engine 19, a heater 16 for heating fuel in the auxiliary fuel chamber 13, and a stirrer 17 for stirring fuel in the auxiliary fuel chamber 13. The fuel pump 15, the heater 16 and the stirrer 17 are connected to the ECU 3, so that the operation of each device is controlled by the ECU 3. The fuel pump 15 is connected to the fuel injection valves of the engine 19 via a fuel supply passage 18. A first fuel return passage 20 for returning to the fuel chamber 13 fuel previously ejected via the fuel pump 15 is connected to a portion of the fuel supply passage 18 extending within the auxiliary fuel chamber 13. The fuel supply passage 18 is provided with a pressure governor valve 96 for adjusting the pressure of fuel to be supplied to the fuel injection valves. The first fuel return passage 20 is provided with a changeover valve 21 for changing between a passage connection for returning fuel ejected from the pressure governor valve 96 directly to the auxiliary fuel chamber 13 and a passage connection to a third fuel return passage 97 that extends in an upper space in the auxiliary fuel chamber 13 for returning fuel to the auxiliary fuel chamber 13 from above. Normally, the changeover valve 21 is controlled to return fuel ejected from the pressure governor valve 96 directly into the auxiliary fuel chamber 13. The changeover valve 21 is connected to the ECU 3, so that the operation thereof is controlled by the ECU 3. A second fuel return passage 22 extends from the fuel injection valves to an upper space in the auxiliary fuel chamber 13 for returning to the auxiliary fuel chamber 13, a portion of the fuel supplied to the fuel injection valves but not used for fuel injection to cylinders (not shown) of the engine 19. The second fuel return passage 22 is provided with a second shutoff valve 23 for shutting the second fuel return passage 22. The second shutoff valve 23 is connected to the ECU 3, so that the operation thereof is controlled by the ECU 3.

The main fuel chamber 14 has therein a fuel gauge 24 for detecting the amount of fuel present in the main fuel chamber 14. The fuel gauge 24 is connected to the ECU 3, and sends thereto an output signal in accordance with the amount of fuel present in the main fuel chamber 14. Mounted to the upper wall 4 of the fuel tank 1 are a tank internal pressure sensor 25 for detecting the pressure in the fuel tank 1 (hereinafter, referred to as "tank internal pressure"), a tank temperature sensor 26 for detecting the temperature in the fuel tank 1 (hereinafter, referred to as "tank temperature"), and a fuel vapor concentration sensor 27 for detecting the fuel vapor concentration in the gas present in the space above the surface of liquid fuel in the fuel tank 1. The tank internal pressure sensor 25, the tank temperature sensor 26 and the fuel vapor concentration sensor 27 are connected to the ECU 3, and send thereto output signals in accordance with the tank internal pressure, the tank temperature and the fuel vapor concentration, respectively.

A fuel vapor discharge passage 28 for discharging fuel vapor-containing gas out of the fuel tank 1 is connected at one end thereof to the upper wall 4 of the fuel tank 1. The opening of the fuel chamber 2 at that end is opened to an upper space in the main fuel chamber 14. The other end of the fuel vapor discharge passage 28 is connected to a charcoal canister 29.

Figure 3:
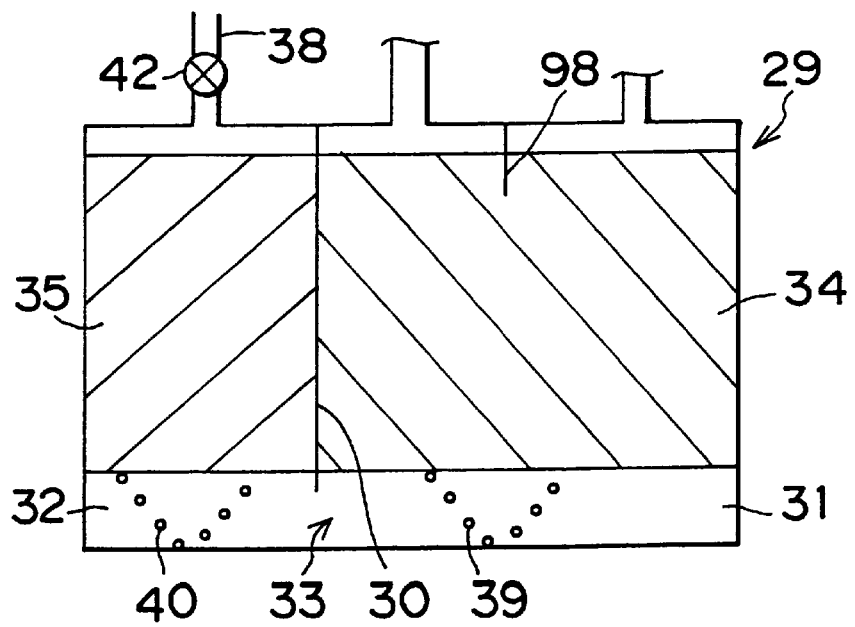
FIG. 3 illustrates a charcoal canister in the first embodiment.

As shown in detail in FIG. 3, an internal space of the charcoal canister 29 is divided into a first canister chamber 31 and a second canister chamber 32 by a first partition 30. The first canister chamber 31 and the second canister chamber 32 communicate with each other via a passage 33 formed in the first partition 30. The first canister chamber 31 contains first activated carbon 34 for temporarily adsorbing and retaining fuel vapor. The first activated carbon 34 is fitted in the first canister chamber 31 in such a manner that spaces are formed on opposite sides of the first activated carbon 34, that is, upper and lower sides thereof in FIGS. 1 and 3. The second canister chamber 32 contains second activated carbon 35 fitted in such a manner that spaces are formed on opposite sides of the second activated carbon 35, that is, upper and lower sides thereof in FIGS. 1 and 3. The space below the first activated carbon 34 and the space below the second activated carbon 35 communicate with each other via the passage 33. The space above the first activated carbon 34 is divided into two spaces by a second partition 98. One of the two spaces is connected in communication to the aforementioned other end of the fuel vapor discharge passage 28, and the other space is connected in communication to an end of a purge pipe 37 that is connected to an intake passage 36 of the internal combustion engine. Therefore, in the first embodiment, the fuel vapor discharge passage 28 and the purge pipe 37 communicate with each other via the first activated carbon 34. The space above the second activated carbon 35 is connected in communication to an atmosphere pipe 38 that is opened to the atmosphere. Therefore, the fuel vapor discharge passage 28 and the purge pipe 37 communicate with the atmosphere via the first activated carbon 34 and the second activated carbon 35. The first activated carbon 34 and the second activated carbon 35 are supported by coil springs 39, 40, respectively.

The purge pipe 37 is provided with a third shutoff valve 41 for shutting the purge pipe 37. The atmosphere pipe 38 is provided with a fourth shutoff valve 42 for shutting the atmosphere pipe 38. The third shutoff valve 41 and the fourth shutoff valve 42 are connected to the ECU 3, so that the operation of each valve is controlled by the ECU 3. The third shutoff valve 41 and the fourth shutoff valve 42 are opened when fuel vapor is to be flowed from the charcoal canister 29 into the intake passage 36. It is determined whether fuel vapor is to be flowed from the charcoal canister 29 into the intake passage 36, on the basis of the engine operating condition.

Figure 4:
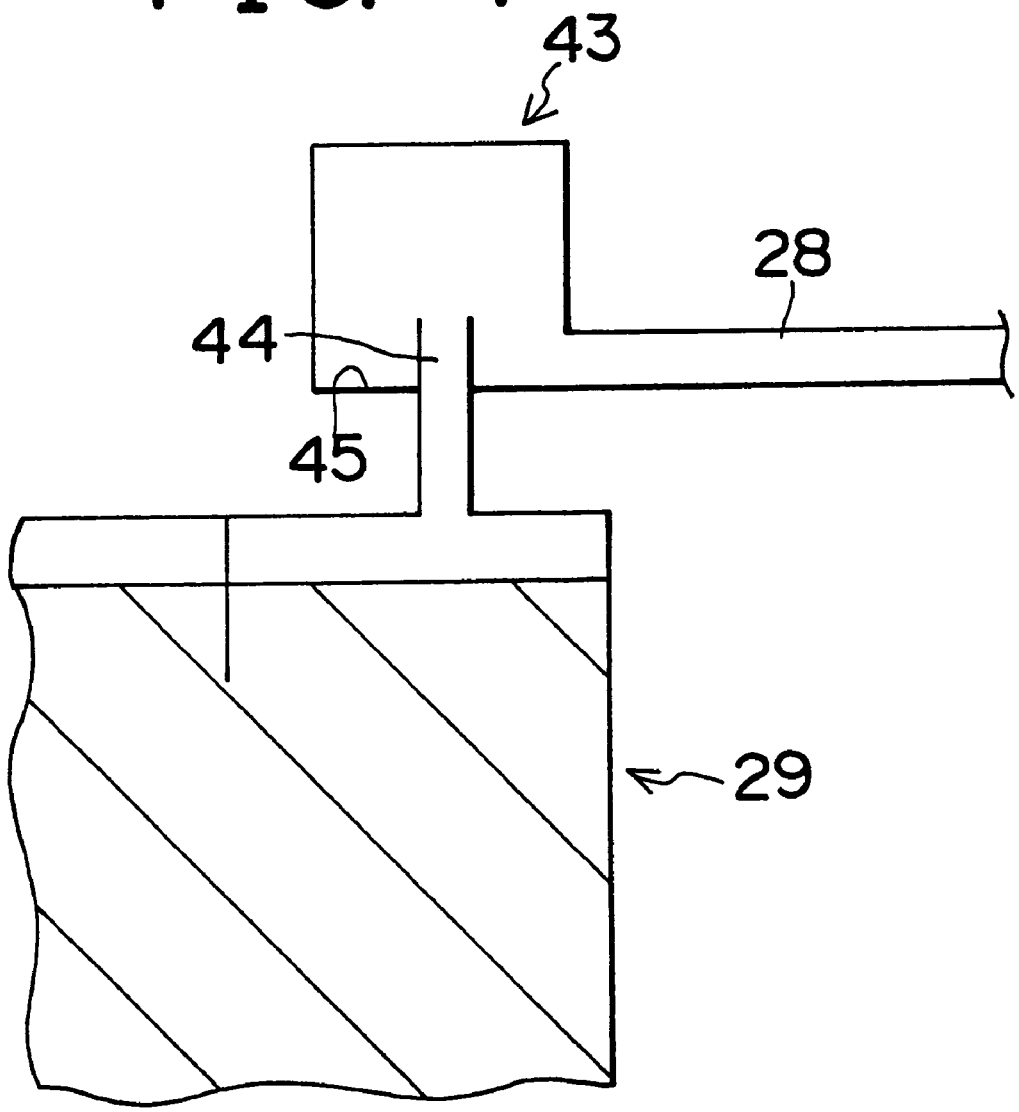
FIG. 4 illustrates a liquid holding mechanism in the first embodiment.

If fuel vapor liquefies in the fuel vapor discharge passage 28 and fuel liquid flows therefrom into the charcoal canister 29, pores of activated carbon adjacent to the fuel vapor discharge passage 28 are thereby closed so that fuel vapor flowing from the fuel vapor discharge passage 28 into the charcoal canister 29 is prevented from flowing into the first and second activated carbon units 34, 35. Therefore, the fuel vapor discharge passage 28 is provided with a liquid holding mechanism 43 for preventing fuel liquid from flowing into the charcoal canister 29. As shown in detail in FIG. 4, the liquid holding mechanism 43 has a pipe 44 that is protruded upward from a bottom wall 45 of the liquid holding mechanism 43. Therefore, fuel liquefied from fuel vapor before flowing into the charcoal canister 29 dwells on the bottom wall 45 of the liquid holding mechanism 43, thereby preventing fuel liquid from flowing into the charcoal canister 29.

A diaphragm valve 46 is provided in a portion of the fuel vapor discharge passage 28 that extends between the liquid holding mechanism 43 and the fuel tank 1. The diaphragm valve 46 opens when the tank internal pressure becomes higher than a predetermined pressure (valve opening pressure). When the tank internal pressure becomes lower than the valve opening pressure, the diaphragm valve 46 closes.

The intake passage 36 of the internal combustion engine is provided with a throttle valve 47 for controlling the amount of air flowing into the engine 19 (hereinafter, referred to as "intake air"). The purge pipe 37 is connected to a portion of the intake passage 36 that extends downstream of the throttle valve 47. A portion of the intake passage 36 upstream of the throttle valve 47 is provided with an intake temperature sensor 48 for detecting the temperature of intake air. The intake temperature sensor 48 is connected to the ECU 3, and sends thereto an output signal in accordance with the temperature of intake air. In this specification, the terms "upstream" and "downstream" are based on the flowing direction of intake air or the flowing direction of exhaust gas discharged from the engine 19.

The engine 19 is provided with a cooling water temperature sensor 49 for detecting the temperature of cooling water used to cool the engine 19. The cooling water temperature sensor 49 is connected to the ECU 3, and sends thereto an output signal in accordance with the cooling water temperature.

The engine 19 is also provided with an exhaust passage 50 for discharging exhaust gas from the engine 19 into the atmosphere. An exhaust gas guide pipe 51 for leading exhaust gas to the vicinity of the fuel tank 1 is connected at one end thereof to the exhaust passage 50. The other end of the exhaust gas guide pipe 51 is connected to a portion of the exhaust passage 50 that extends downstream of the connecting portion of the first end of the exhaust gas guide pipe 51 to the exhaust passage 50. The exhaust gas guide pipe 51 is provided with a fifth shutoff valve 52 for shutting the exhaust gas guide pipe 51. The fifth shutoff valve 52 is connected to the ECU 3, and the operation thereof is controlled by the ECU 3. The exhaust passage 50 is provided with an exhaust temperature sensor 53 for detecting the temperature of exhaust gas. The exhaust temperature sensor 53 is connected to the ECU 3, and sends thereto an output signal in accordance with the exhaust gas temperature. The exhaust gas guide pipe 51 may also be an exhaust gas reflux passage for returning exhaust gas into the intake passage 36. In this case, the fifth shutoff valve 52 functions as an exhaust gas reflux control valve for controlling the reflux of exhaust gas to the intake passage 36.

The fuel vapor control apparatus of the first embodiment is equipped with an external air temperature sensor 54 for detecting the temperature of external air. The external air temperature sensor 54 is connected to the ECU 3, and sends thereto an output signal in accordance with the external air temperature.

The operation of the fuel vapor control according to the first embodiment will be briefly described. The fuel vapor control according to the first embodiment is performed by an operation of discharging air from the fuel tank 1 (hereinafter, referred to as "air discharging operation"). In the first embodiment, the heater 16 is operated during operation of the engine if the fuel vapor concentration detected by the tank temperature sensor 26 is lower than a predetermined concentration. When operated, the heater 16 heats fuel in the auxiliary fuel chamber 13 to promote fuel vaporization, so that the fuel vapor concentration in the fuel tank 1 increases and the tank internal pressure increases. When the tank temperature increases from the present temperature to a predetermined temperature by fuel being heated and the tank internal pressure reaches the valve opening pressure of the diaphragm valve 46, the diaphragm valve 46 opens, thereby discharging gas containing air and fuel vapor from the fuel tank 1 into the charcoal canister 29. As fuel is continuously heated, fuel vaporizes and gas flows out of the fuel tank 1 into the charcoal canister 29, so that the amount of air in the fuel tank 1 decreases. Therefore, the fuel vapor concentration in the fuel tank 1 rises.

Since the vapor pressure of air is higher than that of fuel, the tank internal pressure decreases with increases in the fuel vapor concentration, that is, with decreases in the amount of air relative to the amount of fuel vapor, provided that the tank temperature remains unchanged. Therefore, as gas containing air and fuel vapor flows out of the fuel tank 1, the fuel vapor concentration increases, so that the tank internal pressure temporarily decreases below the valve opening pressure of the diaphragm valve 46. If the heating of fuel is continued so that the tank temperature increases, the tank internal temperature becomes higher than the valve opening pressure of the diaphragm valve 46, so that gas containing air and fuel vapor is discharged from the fuel tank 1 again. In this manner, the discharge of air and fuel vapor from the fuel tank 1 is repeated. When the tank temperature reaches a predetermined temperature (hereinafter, referred to as "air discharge temperature"), air is substantially completely discharged out of the fuel tank 1. The fuel vapor concentration thus reaches a predetermined concentration. This predetermined concentration is set to such a value that substantially no further increase in the amount of fuel vapor in the fuel tank 1 will occur when the heater operation is discontinued. The predetermined fuel vapor concentration can be experimentally determined in advance.

When the fuel vapor concentration exceeds the predetermined concentration, the operation of the heater 16 is discontinued to stop heating fuel. Upon discontinuation of the heating of fuel, the tank temperature starts to decrease so that the tank internal pressure decreases. When the tank internal pressure becomes lower than the valve opening pressure of the diaphragm valve 46, the diaphragm valve 46 closes. Therefore, the fuel tank 1 becomes closed in a state that substantially no air is present but substantially only fuel vapor is present in the space above the surface of liquid fuel. After that, when the tank temperature returns to the temperature occurring before the fuel heating, the tank internal pressure becomes equal to the vapor pressure of fuel vapor. Therefore, in the first embodiment, as long as the tank temperature is below the air discharge temperature, the tank internal pressure does not reach the valve opening pressure and, therefore, fuel vapor does not flow out of the fuel tank 1.

The fuel vapor control operation according to the first embodiment will be described in detail with reference to the flowchart shown in FIG. 5. In step S100, it is determined whether an engine operation flag Fdrive has been set (Fdrive=1). The engine operation flag Fdrive is set upon start of the internal combustion engine, and the flag is reset upon discontinuation of operation of the engine. If Fdrive=1, it is considered that it should be determined whether to execute the vapor fuel control, and the operation proceeds to step S102. Conversely, if Fdrive=0, it is considered that the fuel vapor control should not be executed, and the operation proceeds to step S110. In step S110, the operation of the heater 16 is stopped if it is in operation. Subsequently in step S112, the stirrer 17 is stopped if the stirrer 17 is in operation. Then, the execution of the fuel vapor control operation ends.

In step S102, it is determined whether a heating stop flag Foff has been reset (Foff=0). If the tank temperature is higher than a predetermined temperature (hereinafter, referred to as "maximum temperature"), the heating of fuel should be avoided because a further increase in the tank temperature would deteriorate the fuel tank 1. In addition, when the tank temperature is above the maximum temperature, a large amount of fuel vapor has been generated in the fuel tank 1 and it is unnecessary to perform the air discharging operation. If the tank temperature is below a predetermined temperature (hereinafter, referred to as "minimum temperature") that is lower than the maximum temperature, fuel vapor occurs only in a small amount in the fuel tank 1 and the amount of fuel that flows out of the fuel tank 1, even if any flows out, is small. Therefore, if the tank temperature is lower than the minimum temperature, there is no need to perform the air discharging operation. Consequently, the heating stop flag Foff is set if the tank temperature is above the maximum temperature or below the minimum temperature. If the tank temperature is above the minimum temperature and below the maximum temperature, the heating stop flag Foff is reset. The tank temperature is detected by the tank temperature sensor 26. If the amount of fuel in the fuel tank 1 is greater than a predetermined amount (hereinafter, referred to as "maximum amount"), the amount of fuel vapor occurring in the fuel tank 1 is small and the amount of fuel vapor that flows out of the fuel tank 1, even if any flows out, is small. Therefore, if the amount of fuel in the fuel tank 1 is greater than the maximum amount, there is no need to perform the air discharging operation. Consequently, the heating stop flag Foff is set when the amount of fuel in the fuel tank 1 exceeds the maximum amount, and the flag is reset when the amount of fuel in the fuel tank 1 becomes smaller than the maximum amount. The amount of fuel in the fuel tank 1 is detected by the fuel gauge 24.

Figure 6:
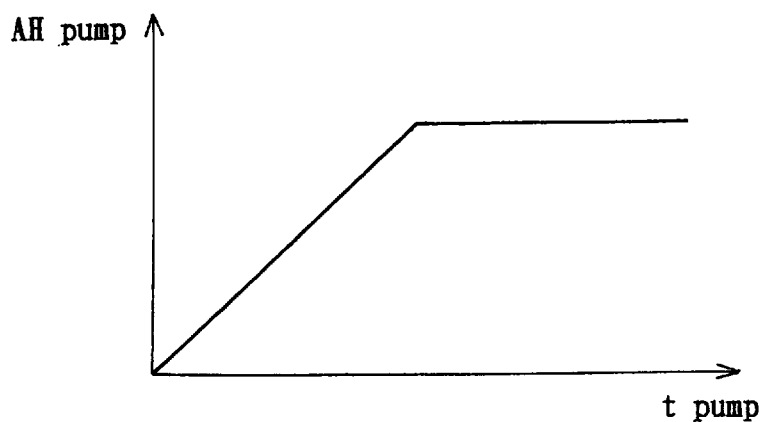
FIG. 6 is a graph indicating a relationship between the operation time of a fuel pump and the quantity of heat occurring from the fuel pump.
Figure 7:
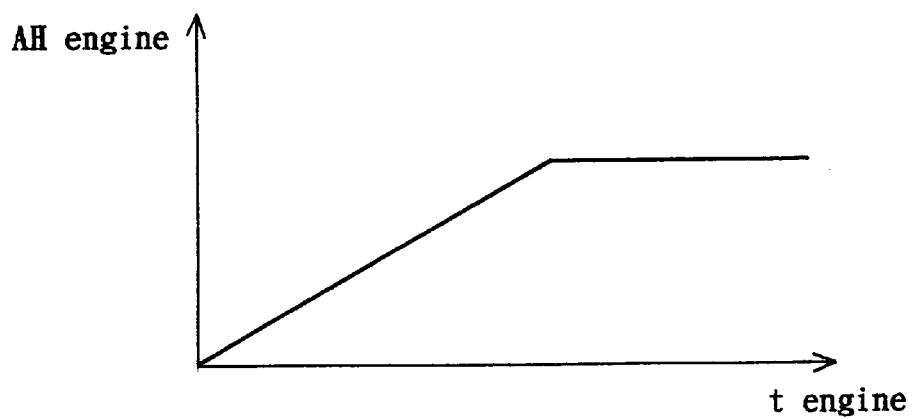
FIG. 7 is a graph indicating a relationship between the operation time of an internal combustion engine and the quantity of heat occurring from the engine.

Although in the first embodiment, the tank temperature is detected by the tank temperature sensor 26, it is also possible to estimate a tank temperature based on the cooling water temperature detected by the cooling water temperature sensor 49 because there is a relationship that the tank temperature increases with increases in the temperature of the engine 19. Furthermore, it is possible to estimate a tank temperature based on the exhaust gas temperature detected by the exhaust temperature sensor 53 because there is a relationship that as the temperature of the engine 19 increases the exhaust air temperature increases. In addition, the fuel tank 1 is heated by heat from the engine 19 and heat from the fuel pump 15. Therefore, it is also possible to estimate a tank temperature based on an equation Ttank=Twater+AHpump+AHengine, where Twater is the cooling water temperature at the time of start of the engine, corresponding to the tank temperature; AHpump is the amount of heat that the fuel tank 1 has received from the fuel pump 15 during the engine operation; and AHenqine is the amount of heat that the fuel tank 1 has received from the engine 19 during the engine operation. The amount of heat AHpump from the fuel pump 15 is read from a map as illustrated in FIG. 6, where tpump is the elapsed time from the start of the fuel pump 15 up to the present time. The amount of heat AHengine from the engine 19 is read from a map as illustrated in FIG. 7, where tengine is the elapsed time from the start of the engine 19 up to the present time. If this manner of estimation is adopted, it becomes unnecessary to provide a sensor dedicated to the detection of the temperature in the fuel tank 1, thereby allowing a production cost reduction. It is also possible to estimate a tank temperature at the time of start of the engine 19 by using the intake air temperature detected by the intake temperature sensor 48 or the external air temperature detected by the external air temperature sensor 54 as a basis for the estimation instead of using the cooling water temperature Twater.

If Foff=0 in step S102, it is considered that it should be determined whether to execute the air discharging operation, and the operation proceeds to step S104. Conversely, if Foff=1 in step S102, it is considered that the air discharging operation should not or need not be executed, and the operation proceeds to step S110. In step S110, the operation of the heater 16 is discontinued to stop heating fuel if the heater 16 is in operation. Subsequently in step S112, the stirrer 17 is stopped if the stirrer 17 is in operation. The execution of the fuel vapor control then ends.

In step S104, it is determined whether the fuel vapor concentration C is lower than a predetermined concentration C100 (C<C100). If C<C100, it is considered that the air discharging operation should be executed, and the operation proceeds to step S106. In step S106, an amount of heat to be generated per unit time is calculated in accordance with the present fuel vapor concentration. Subsequently in step S108, the heater 16 is operated to heat fuel. In step S109, the stirrer 17 is operated. The execution of the fuel vapor control then ends. By operating the stirrer 17 in step S109, vaporization of fuel in the auxiliary fuel chamber 13 is facilitated.

Figure 8:
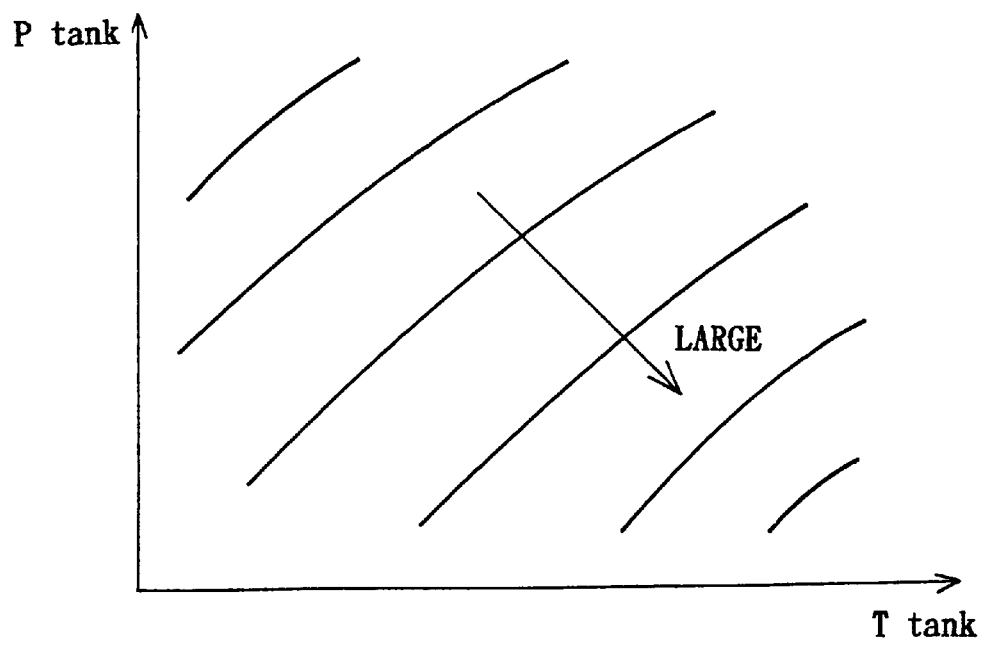
FIG. 8 is a graph indicating a relationship between the temperature in the fuel tank and the pressure in fuel tank.

Normally, the fuel vapor concentration decreases with increases in the tank internal pressure, provided that the tank temperature remains unchanged. The fuel vapor concentration increases with increases in the tank temperature, provided that the tank internal pressure remains unchanged. Therefore, although in the first embodiment, the fuel vapor concentration is detected by the fuel vapor concentration sensor 27, it is also possible to detect the tank internal pressure and the tank temperature as quantities related to the fuel vapor concentration, and determine a fuel vapor concentration corresponding to the detected tank internal pressure and the detected tank temperature by reading a fuel vapor concentration from a map as illustrated in FIG. 8, where Ttank is the tank temperature, and the Ptank is the tank pressure.

Conversely, if C≧C100 in step S104, it is considered that the air discharging operation need not be executed or that the execution of the air discharging operation should be ended, and the operation proceeds to step S110. In step S110, the operation of the heater 16 is discontinued to stop heating fuel if it is in operation. Subsequently in step S112, the stirrer 17 is stopped if the stirrer 17 is in operation. Then, the execution of the fuel vapor control operation ends.

Although in the first embodiment, fuel is heated by the heater 16, it is also possible to heat fuel by increasing the operating voltage of the fuel pump 15 and thereby increasing the amount of heat released from the fuel pump 15. In this case, the heater 16 becomes unnecessary, and the stirrer 17 may also be omitted. It is also possible to heat fuel by opening the second hutoff valve 23 to return fuel heated by heat released from the engine 19 to the auxiliary fuel chamber 13 via the second fuel return passage 22. In this case, since the opening of the second fuel return passage 22 in the fuel tank 1 is located in an upper portion of the space therein, fuel released from the second fuel return passage 22 is likely to vaporize in an upper space in the fuel tank 1 before reaching the auxiliary fuel chamber 13. Therefore, the fuel vapor concentration in the fuel tank 1 quickly increases. In this case, the heater 16 becomes unnecessary. If fuel returns into the auxiliary fuel chamber 13 via the second fuel return passage 22, fuel in the auxiliary fuel chamber 13 is stirred by fuel returning via the second fuel return passage 22. Thus, fuel returning via the second fuel return passage 22 serves to stir fuel. In this case, the stirrer 17 becomes unnecessary. Furthermore, it is possible to heat fuel by opening the fifth shutoff valve 52 to allow exhaust gas to flow near the auxiliary fuel chamber 13 via the exhaust gas guide pipe 51. In this case, too, the heater 16 becomes unnecessary.

Although in the first embodiment, fuel in the auxiliary fuel chamber 13 is stirred by the stirrer 17, it is also possible to stir fuel in the auxiliary fuel chamber 13 by controlling the pressure governor valve 96 so that fuel ejected from the pressure governor valve 96 returns to the auxiliary fuel chamber 13 from above via the third fuel return passage 97. In this case, the stirrer 17 becomes unnecessary.

In the first embodiment, the heater 16 is disposed as a heating device in the auxiliary fuel chamber 13, and the amount of fuel contained in the auxiliary fuel chamber 13 is less than the entire amount of fuel contained in the fuel tank 1. Therefore, the fuel temperature increasing rate achieved by heating the amount of fuel contained in the auxiliary fuel chamber 13 is higher than the fuel temperature increasing rate achieved by heating the entire amount of fuel contained in the fuel tank 1. Hence, the first embodiment is able to achieve the maximum temperature of fuel relatively quickly by heating only the amount fuel present in the auxiliary fuel chamber 13, in comparison with a construction in which the entire amount of fuel contained in the fuel tank is heated to the maximum temperature. Therefore, the embodiment is able to completely discharge air from the fuel tank more quickly and more efficiently than the construction in which the entire amount of fuel in the fuel tank is heated.

Furthermore, in the first embodiment, the fuel tank-side opening of the fuel vapor discharge passage 28 is located in the space above the main fuel chamber 14 instead of the space above the auxiliary fuel chamber 13. That is, the fuel tank-side opening of the fuel vapor discharge passage 28 is offset from the space above the auxiliary fuel chamber 13. Therefore, fuel vapor generated from the auxiliary fuel chamber 13 does not directly flow into the fuel vapor discharge passage 28 while fuel vapor is being released from the fuel tank 1 via the fuel vapor discharge passage 28. In addition, the fuel vapor concentration in the space above the main fuel chamber 14 is lower than that in the space above the auxiliary fuel chamber 13, so that gas having a lower fuel vapor concentration flows into the fuel vapor discharge passage 28. Therefore, the first embodiment is able to discharge air from the fuel tank 1 at high efficiency.

A fuel vapor control operation according to a second embodiment of the invention will be described. The construction of a fuel vapor control apparatus according to the second embodiment is substantially the same as in the first embodiment, and will not be described again. In the first embodiment, when fuel is being supplied during stop of the internal combustion engine, the cap 9 is removed and, therefore, air may possibly flow into the fuel chamber 2. In the second embodiment, the amount of fuel flowing out of the fuel tank 1 via the fuel vapor discharge passage 28 is reduced even if fuel is supplied during stop of the internal combustion engine.

In the second embodiment, when the internal combustion engine is started, it is determined whether fuel was supplied into the fuel tank 1 during the stop of the engine on the basis of whether the cap 9 was removed. If the cap 9 was removed, it is determined that fuel was supplied during the stop of the engine, so that the heater 16 is operated for a predetermined length of time to heat fuel in the auxiliary fuel chamber 13. In this manner, air is completely discharged from the fuel tank 1 in the second embodiment, so that the amount of fuel vapor that flows out of the fuel tank 1 is reduced. The aforementioned predetermined length of time is set to a sufficiently long operation time of the heater 16 to completely discharge from the fuel tank 1 the amount of air flowed into the fuel tank 1 during the fuel filling operation.

The fuel vapor control operation according to the second embodiment will be described in detail with reference to the flowchart in FIG. 9. In step S200, it is determined whether an engine start flag Fstart has been set (Fstart=1). The engine start flag Fstart is set when the internal combustion engine is started. The engine start flag Fstart is reset when the fuel vapor control operation ends. If Fstart=1 in step S200, it is considered that it should be determined whether to execute the fuel vapor control, and the operation proceeds to step S202. Conversely, if Fstart=0 in step S200, the operation proceeds to step S212, in which the operation of the heater 16 is stopped if the heater 16 is in operation. The execution of the fuel vapor control operation then ends.

In step S202, it is determined whether a fuel vapor execution flag Fon has been set (Fon=1). The fuel vapor execution flag Fon is set when during a stop of the engine it is detected by the open-close sensor 10 that the cap 9 has been removed from the upper opening 8 of the fuel supply pipe 5, that is, fuel has been supplied to the fuel tank 1. The fuel vapor execution flag Fon is reset when the fuel vapor control operation ends. If Fon=1 in step S202, it is considered that fuel was supplied to the fuel tank 1 during the stop of the engine, and the operation proceeds to step S204. Conversely, if Fon=0 in step S202, it is considered that fuel was not supplied during the stop of the engine and, therefore, it is unnecessary to execute the fuel vapor control operation. Then the operation proceeds to step S212, in which the heater 16 is stopped if it is in operation. The execution of the fuel vapor control then ends. It is also possible to determine whether fuel was supplied on the basis of the value detected by the fuel gauge 24.

In step S204, it is determined whether the value of a fuel vapor control counter t is zero (t=0). The fuel vapor control counter t is started when the fuel vapor control starts. The fuel vapor control counter t is reset when the fuel vapor control ends. If t=0 in step S204, it is considered that the fuel vapor control has not been started, and the operation proceeds to step S206, in which the heater 16 is operated. Subsequently in step S208, the fuel vapor control counter t is incremented. The execution of the fuel vapor control operation then ends. Conversely, if t≠0 in step S204, the operation proceeds to step S210.

In step S210, it is determined whether the value of the fuel vapor control counter t is less than a predetermined time t0(t<t0). If t<t0, it is considered that the fuel vapor control should be executed. Then the execution of the fuel vapor control operation ends without stopping the heater 16. Conversely, if t>t0 in step S210, it is considered that the fuel vapor control should be ended. The operation then proceeds to step S212, in which the heater 16 is stopped. Subsequently in step S214, the fuel vapor control counter t is reset. The execution of the fuel vapor control operation then ends. The aforementioned predetermined time t0 is set to a sufficiently long operation time of the heater 16 to completely discharge air flowed into the fuel tank 1 during the fuel filling operation.

A fuel vapor control operation according to a third embodiment of the invention will be described. In the first embodiment, if the temperature in the fuel tank 1 decreases after air is completely discharged from the fuel tank 1, the pressure in the fuel tank 1 (hereinafter, referred to as "after-heat tank internal pressure") becomes lower than the pressure occurring in the fuel tank 1 before the heating of fuel. If there is a possibility that the after-heat tank internal pressure may become greatly lower than the atmospheric pressure, the fuel tank 1 needs to have such a strength as to withstand a great difference between the after-heat tank internal pressure and the atmospheric pressure, thereby increasing the production cost of the fuel tank 1. Therefore, the third embodiment is devised to prevent an excessive reduction in the tank internal pressure after the heating of fuel.

Figure 10:
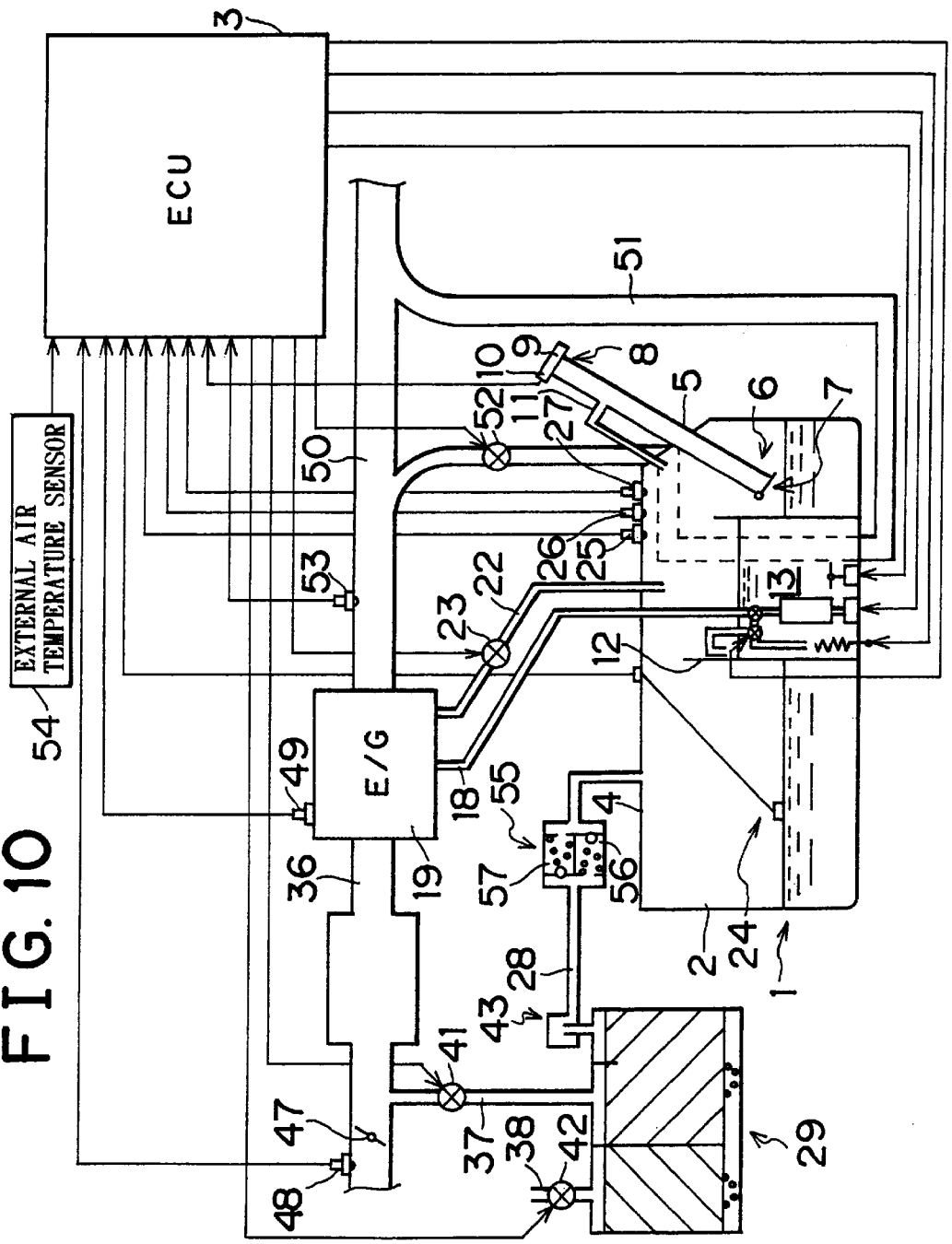
FIG. 10 is a diagram of a fuel tank equipped with a fuel vapor control apparatus according to a third embodiment of the invention.

As shown in FIG. 10, in the third embodiment, a two-way valve 55 is provided in the fuel vapor discharge passage 28, instead of the diaphragm valve 46 in the first embodiment. The two-way valve 55 has a positive pressure valve 56 that opens when the pressure in the fuel tank 1 exceeds a predetermined positive pressure, and a negative pressure valve 57 that opens when the pressure in the fuel tank 1 exceeds a predetermined negative pressure. In the third embodiment, therefore, if the pressure in the fuel tank 1 becomes lower than the predetermined negative pressure, the negative pressure valve 57 of the two-way valve 55 opens to allow air to flow into the fuel tank 1 via the fuel vapor discharge passage 28, thereby preventing an excessive reduction in the pressure in the fuel tank 1. In this occasion, the fourth shutoff valve 42 is open. In order to cope with a situation that the fourth shutoff valve 42 has been closed in such an occasion, it is possible to adopt a construction in which the fourth shutoff valve 42 is opened when a pressure lower than the predetermined negative pressure is detected by the pressure sensor 25. The fuel vapor control operation in the third embodiment is substantially the same as in the first or second embodiment, and will not be described again.

A fuel vapor control apparatus according to a fourth embodiment of the invention will be described. The temperature of the fuel tank 1 during stop of the internal combustion engine is lower than the temperature of the fuel tank 1 during operation of the engine since heat is dissipated from the fuel tank 1 to the atmosphere during stop of the engine. Therefore, the pressure in the fuel tank 1 during stop of the engine is lower than the pressure in the fuel tank 1 during operation of the engine. Therefore, there is a possibility that during stop of the engine the pressure in the fuel tank 1 may become lower than the valve opening pressure of the negative pressure valve 57 of the two-way valve 55, that is, the predetermined negative pressure, in the third embodiment and, therefore, air may flow into the fuel tank 1. Therefore, in the fourth embodiment, if air is considered to have flown into the fuel tank during stop of the internal combustion engine, air is completely discharged from the fuel tank to restrict the amount of fuel vapor flowing out of the fuel tank to a small amount.

The fuel vapor control according to the fourth embodiment will be described. The construction of the fuel vapor control apparatus in the fourth embodiment is substantially the same as in the third embodiment, and will not be described again. In the fourth embodiment, the temperature in the fuel tank 1 and the temperature of intake air are detected when the internal combustion engine is started. If the difference between the fuel tank temperature and the intake air temperature is smaller than a predetermined value, it is determined that there is a possibility that the pressure in the fuel tank 1 is lower than the predetermined negative pressure, that is, the valve opening pressure of the negative pressure valve 57 of the two-way valve 55. Therefore, if the difference between the fuel tank temperature and the intake air temperature is less than the predetermined value, the heater 16 is operated to heat fuel in the fuel tank 1 for a predetermined length of time in order to completely discharge air from the fuel tank 1. In this manner, the fourth embodiment prevents fuel vapor from flowing out of the fuel tank 1 during operation of the internal combustion engine even if air has flown into the fuel tank 1 during the stop of the engine.

Figure 9:
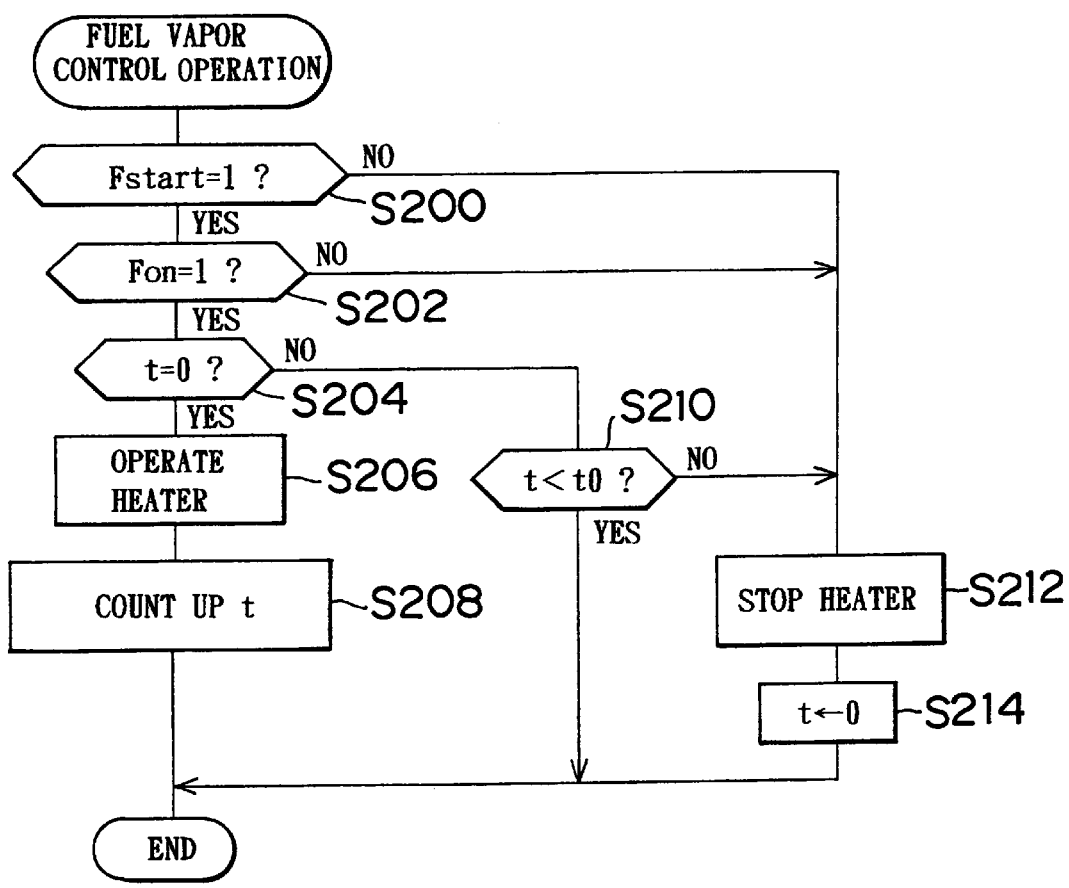
FIG. 9 is a flowchart illustrating a fuel vapor control operation in a second embodiment of the invention.

The fuel vapor control in the fourth embodiment is performed as illustrated in the flowchart of FIG. 9. This control operation is substantially the same as that in the second embodiment, and will not be described in detail again. In the fourth embodiment, the fuel vapor execution flag Fon is set if the difference Ttank−Tintake between the temperature Ttank in the fuel tank 1 and the temperature Tintake of intake air detected at the time of start of the internal combustion engine is less than a predetermined temperature difference T0 (Ttank−Tintake<T0). The fuel vapor execution flag Fon is reset when the fuel vapor control ends.

A fuel vapor control apparatus according to a fifth embodiment will be described. Whereas the fourth embodiment employs the tank temperature sensor 26 dedicated to the use for the fuel vapor control, the fifth embodiment employs an intake air temperature sensor that can be used for the fuel vapor control and other operations, thereby allowing a reduction in the production cost of the fuel vapor control apparatus.

The fuel vapor control according to the fifth embodiment will be described. The construction of the fuel vapor control apparatus in the fifth embodiment is substantially the same as in the second embodiment, and will not be described again. In the fifth embodiment, the intake air temperature is detected by using the intake temperature sensor 48 at the time of start of the internal combustion engine. If the intake air temperature is lower than a predetermined temperature, it is determined that the temperature in the fuel tank 1 is low due to a low external air temperature. Therefore, if the intake air temperature is lower than the predetermined temperature, it is determined that there is a possibility that the temperature in the fuel tank 1 is low and the pressure in the fuel tank 1 became lower than the predetermined negative pressure, that is, the valve opening pressure of the two-way valve 55, during stop of the internal combustion engine. Hence, if the intake air temperature is lower than the predetermined temperature, the heater 16 is operated to heat fuel for a predetermined length of time in order to completely discharge air from the fuel tank 1. The intake temperature sensor 48 is also used to determine an amount of fuel to be injected into the cylinders of the internal combustion engine or a fuel injection timing in accordance with the intake air temperature. Therefore, using the sensor that can be used not only for the fuel vapor control but also other operations, the fifth embodiment reduces the amount of fuel vapor that flows out of the fuel tank 1 to a low level.

The fuel vapor control in the fifth embodiment is executed as illustrated in the flowchart of FIG. 9. This control is substantially the same as that in the second embodiment, and will not be described in detail again. In the fifth embodiment, the fuel vapor execution flag Fon is set if the intake air temperature Tintake detected at the time of start of the internal combustion engine is lower than the predetermined temperature Tintake0 (Tintake<Tintake0). The fuel vapor execution flag Fon is reset when the fuel vapor control ends.

A fuel vapor control apparatus according to a sixth embodiment will be described. Although in the fifth embodiment it is determined whether air has flown into the fuel tank 1 on the basis of the intake air temperature, there are some cases where the intake air temperature does not correspond to the temperature in the fuel tank 1. That is, there is a possibility that air has not flown into the fuel tank 1 even if the intake air temperature is lower than the predetermined temperature. Therefore, the sixth embodiment more precisely determines whether air flew into the fuel tank 1 during stop of the internal combustion engine.

The fuel vapor control in the sixth embodiment will be described. The construction of the fuel vapor control apparatus in the sixth embodiment is substantially the same as in the third embodiment, and will not be described again. In the sixth embodiment, the pressure in the fuel tank 1 is detected when the internal combustion engine is started. If the tank internal pressure equals a predetermined positive pressure, that is, a valve opening pressure of the positive pressure valve 56 of the two-way valve 55, it is determined that air flew into the fuel tank 1 during stop of the internal combustion engine so that the tank internal pressure increased to the predetermined positive pressure. Therefore, if the tank internal pressure equals the predetermined positive pressure, the heater 16 is operated to heat fuel for a predetermined length of time in order to completely discharge air from the fuel tank 1. If the tank internal pressure equals the predetermined negative pressure, that is, the valve opening pressure of the negative pressure valve 57 of the two-way valve 55, it is determined that there is a possibility that the pressure in the fuel tank 1 became lower than the predetermined negative pressure and air flew into the fuel tank 1 during stop of the engine. Therefore, if the tank internal pressure equals the predetermined negative pressure, the heater 16 is operated to heat fuel for a predetermined length of time in order to completely discharge air from the fuel tank 1.

The fuel vapor control in the sixth embodiment is executed as illustrated in the flowchart of FIG. 9. This control operation is substantially the same as that in the second embodiment, and will not be described in detail again. In the sixth embodiment, the fuel vapor execution flag Fon is set if the pressure in the fuel tank 1 detected at the time of start of the internal combustion engine is equal to the predetermined positive pressure, that is, the valve opening pressure of the positive pressure valve 56 of the two-way valve 55, or is equal to the predetermined negative pressure, that is, the valve opening pressure of the negative pressure valve 57 of the two-way valve 55. The fuel vapor execution flag Fon is reset when the fuel vapor control ends.

Figure 11:
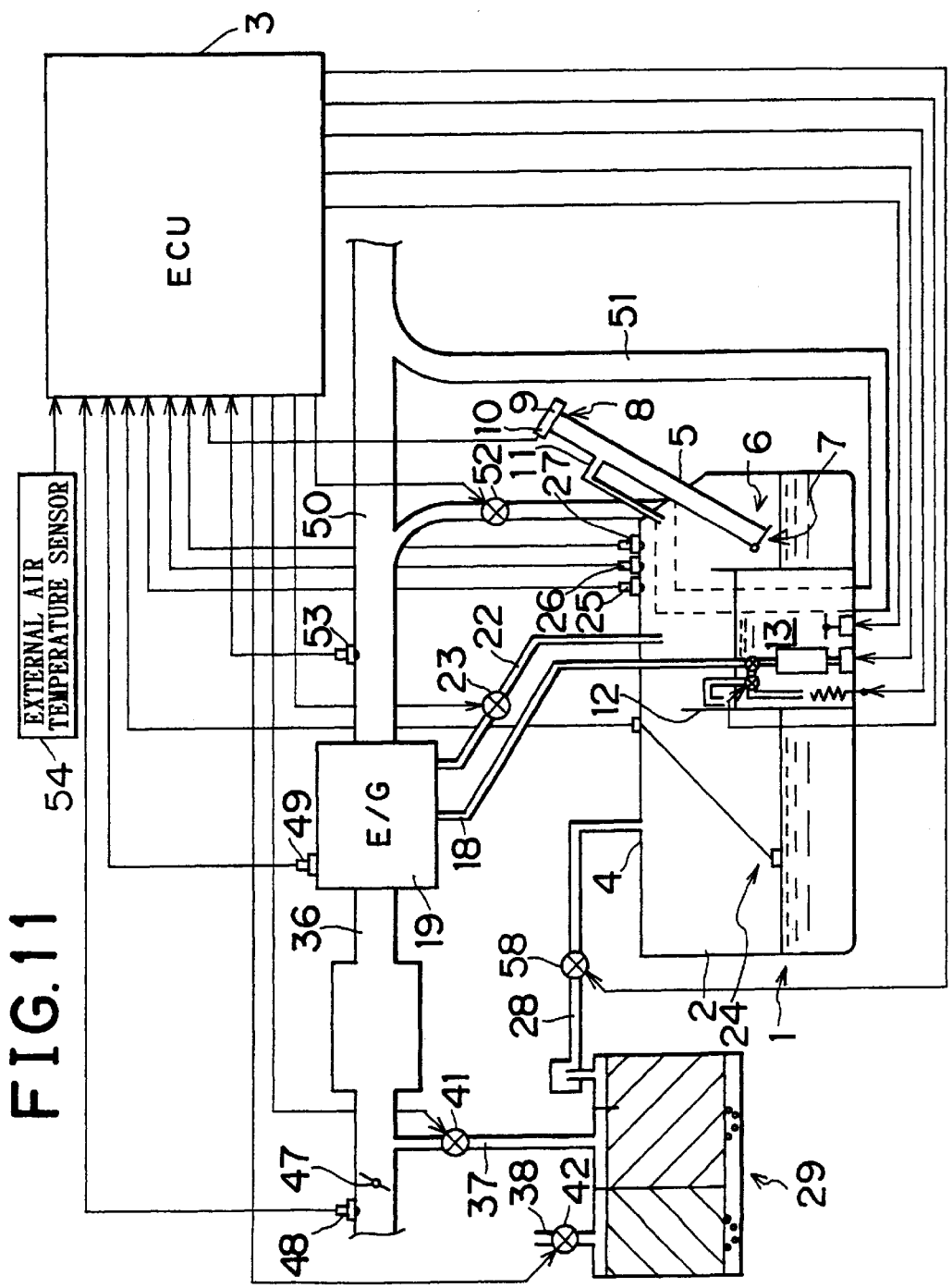
FIG. 11 is a fuel tank equipped with a fuel vapor control apparatus according to a seventh embodiment of the invention.

A fuel vapor control apparatus according to a seventh embodiment will be described. As shown in FIG. 11, the fuel vapor control apparatus of the seventh embodiment has a control valve 58 that is connected to a fuel vapor discharge passage 28, in place of the diaphragm valve in the first embodiment. The opening and closing operation of the control valve 58 is controlled by the ECU 3. Other components and the like in the seventh embodiment are substantially the same as in the first embodiment, and will not be described again.

The fuel vapor control in the seventh embodiment will be described. In the seventh embodiment, if the fuel vapor concentration in the fuel tank 1 is lower than a predetermined concentration, the heater 16 is operated to heat fuel as in the first embodiment and, simultaneously, the control valve 58 is opened. In this manner, air is discharged from the fuel tank 1. If the fuel vapor concentration is higher than the predetermined concentration, the operation of the heater 16 is stopped and, simultaneously, the control valve 58 is closed. In this manner, the fuel tank 1 is closed after air has been substantially completely discharged from the fuel tank 1, so that air will not flow into the fuel tank 1. Therefore, the seventh embodiment is able to keep the amount of fuel vapor flowing out of the fuel tank 1 to a low level. Other operations are substantially the same as those in the first embodiment, and will not be described again.

Figure 12:
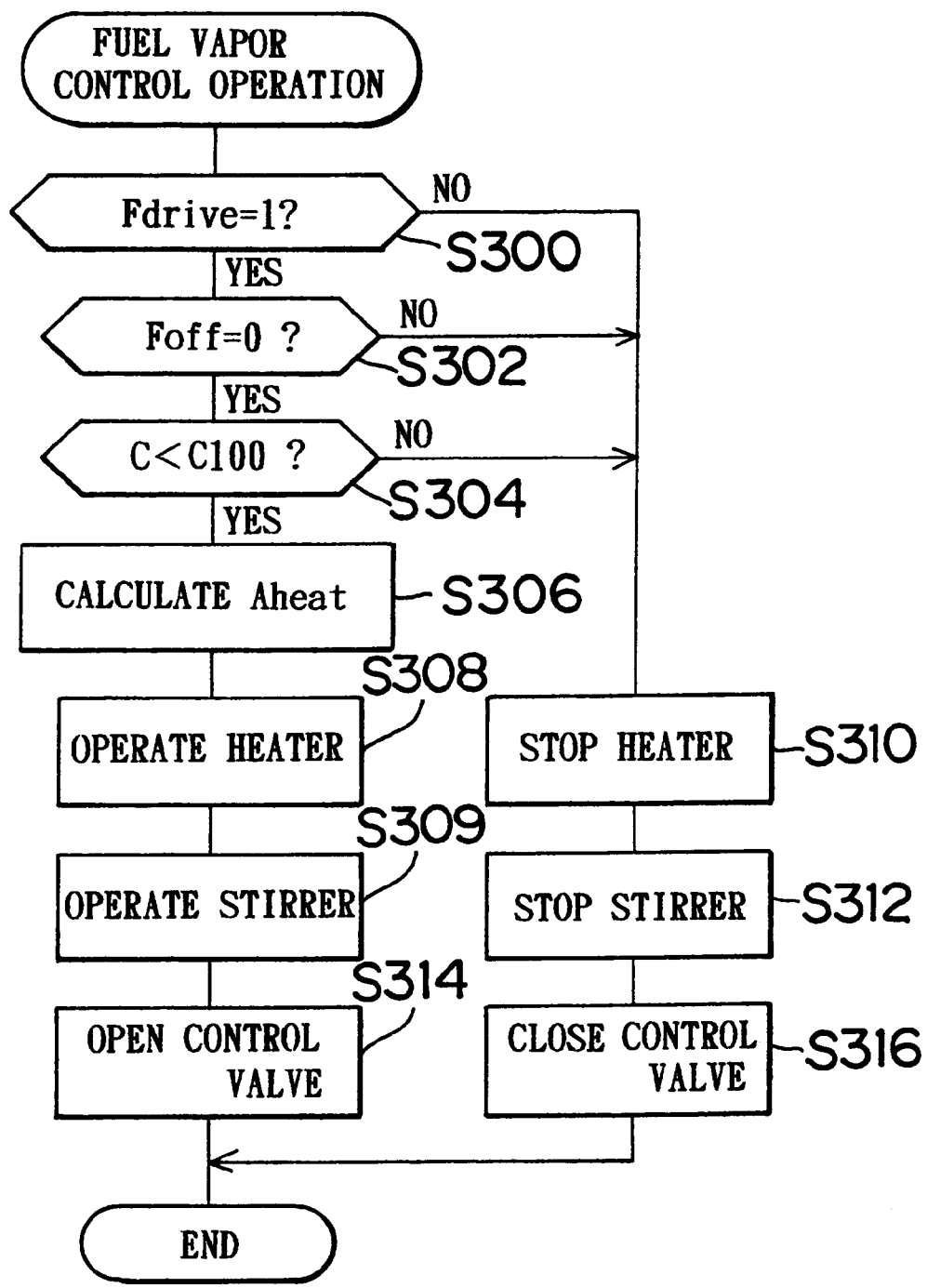
FIG. 12 is a flowchart illustrating a fuel vapor control operation in the seventh embodiment.

The fuel vapor control in the seventh embodiment will be described in detail with reference to the flowchart shown in FIG. 12. Steps S300 through S312 in the seventh embodiment are equivalent to steps S100 through 112 in the first embodiment, and will not be described again. In the seventh embodiment, after the stirrer 7 is operated in step 309 following the affirmative determination (C<C100) in step S304, the control valve 58 is opened in step S314. Conversely, after the stirrer 7 is stopped in step S312 following the negative determination (C>C100) in step S304, the control valve 58 is closed in step S316.

Figure 13:
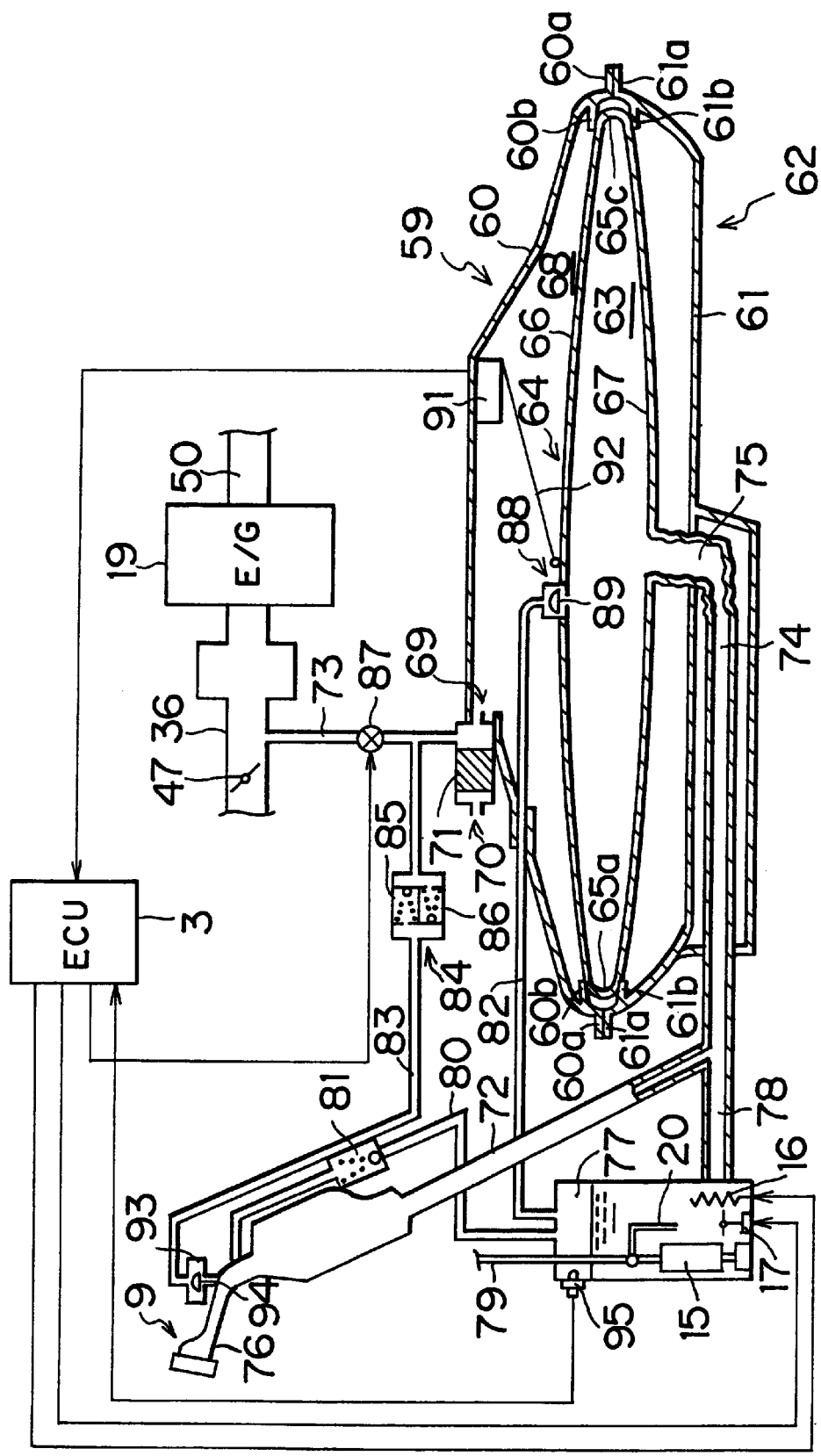
FIG. 13 is a fuel storage apparatus equipped with a fuel vapor control apparatus according to an eighth embodiment of the invention.

An eighth embodiment of the invention will be described. A fuel storage apparatus 59 shown in FIG. 13 is used as, for example, a tank for storing fuel to be supplied into an internal combustion engine. The fuel storage apparatus 59 may also be used as a tank for merely storing fuel. As shown in FIG. 13, the fuel storage apparatus 59 has an upper portion 60 and a lower portion 61 each of which has a generally cup shape. The upper portion 60 and the lower portion 61 are joined together at their first flanges 60a, 61a formed along peripheral edges of the upper and lower portions 60, 61. Disposed in a housing 62 is a fuel container or fuel tank 64 that defines therein a fuel chamber 63 for storing fuel. A second flange 60b is protruded inward from an inner wall surface of the upper portion 60. A second flange 61b is protruded inward from an inner wall surface of the lower portion 61. Connecting portions between side walls 65a–65d and an upper wall 66 and a lower wall 67 (described in detail below) are interposed between the second flanges 60b, 61b. The fuel tank 64 is thereby retained in the housing 62 in such a manner that the upper wall 66 and the lower wall 67 of the fuel tank 64 are displaceable upward and downward.

Figure 14:
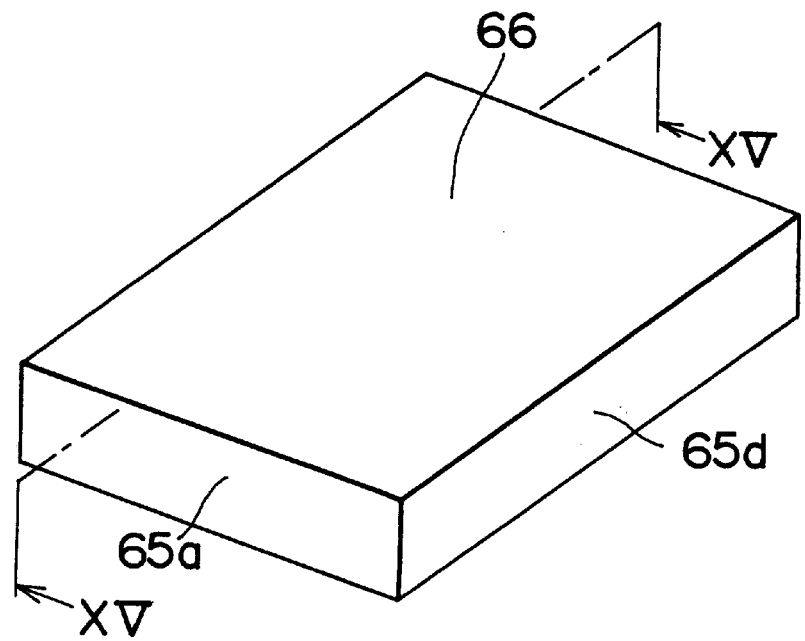
FIG. 14 is a perspective view of a fuel tank in the eighth embodiment.
Figure 15:
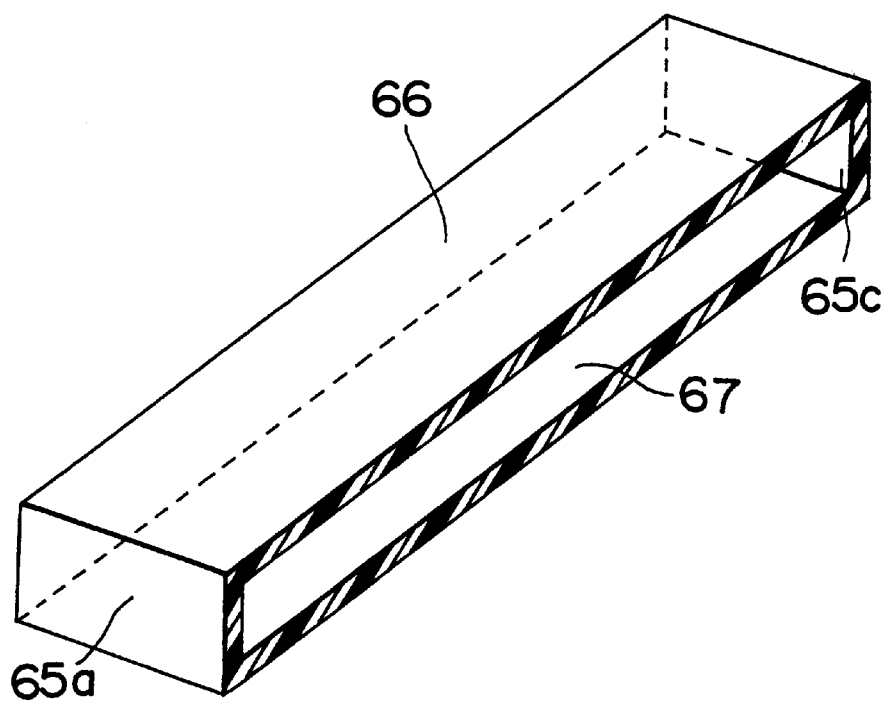
FIG. 15 is a sectional view of the fuel tank taken on line XV—XV in FIG. 14.

Referring to FIGS. 14 and 15, the fuel tank 64 in the eighth embodiment is provided with the upper wall 66, the lower wall 67, and the four generally rectangular side walls 65a–65d connecting the corresponding sides of the upper and lower walls 66, 67. Each of the side walls 65a–65d is connected at its opposite edges to adjacent side walls. The fuel tank 64 thus has a generally rectangular parallelepiped shape, and defines therein the fuel chamber 63. Therefore, each wall 66, 67, 65a–65d of the fuel tank 64 corresponds to a partition that divides the interior space of the fuel storage apparatus 59 into the fuel chamber 63 and an air chamber 68. Each of the upper and lower walls 66, 67 and the side walls 65a–65d has a multi-layer structure formed by covering the opposite surfaces of a flat core portion formed from a nylon or a copolymer resin of ethylene and vinyl, with skin portions formed from a high-density polyethylene. The upper and lower walls 66, 67 and the side walls 65a–65d are substantially rigid. The area of each of the upper wall 66 and the lower wall 67 of the fuel tank 64 is larger than the area of one of the side walls 65a–65d. The rigidity of the upper and lower walls 66, 67 are lower than the rigidity of the side walls 65a–65d. The general shape of the upper and lower walls 66, 67 is not limited to a rectangle, but may also be any other polygon as long as the upper and lower walls 66, 67 correspond to each other in shape. That is, the shapes of the upper and lower walls 66, 67 and the side walls 65a–65d may be suitably selected in accordance with the shape of a space in which the fuel tank 64 is disposed.

Figure 16:
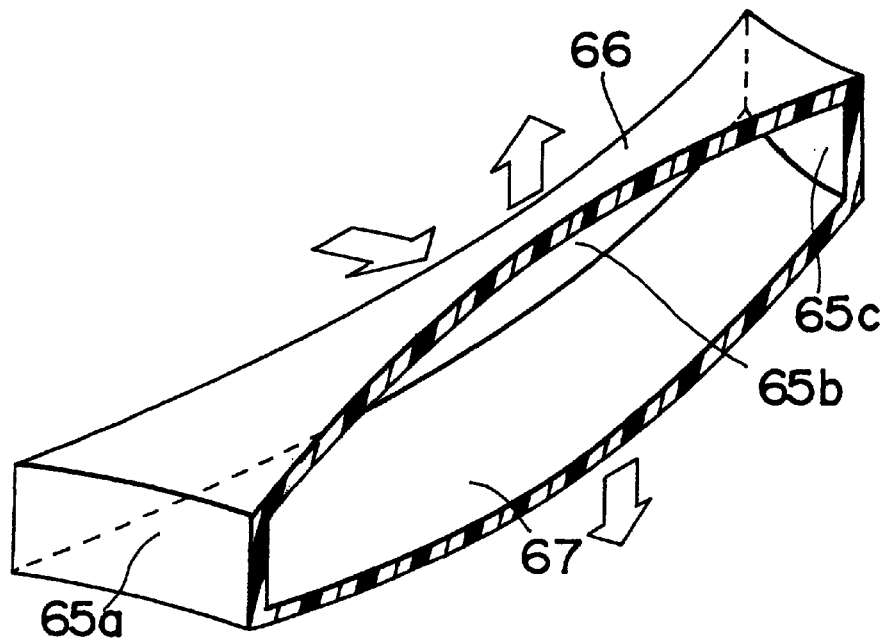
FIG. 16 is a sectional view of the fuel tank when the amount of fuel contained in the fuel tank is greater than a predetermined amount.

As shown in FIG. 16, when fuel is supplied into the fuel tank 64 in an amount exceeding an amount of fuel that can be stored in the fuel tank 54 while the generally rectangular parallelepiped shape of the fuel tank 64 is retained (hereinafter, referred to as "predetermined amount"), the upper wall 66 and the lower wall 67 curve or expand outwards so as to separate apart from each other, and the side walls 65a–65d curve or sink inwards so as to come closer to one another. That is, in the eighth embodiment, if the amount of fuel in the fuel tank 64 exceeds the predetermined amount, the upper wall 66 and the lower wall 67 are displaced upwards and downwards, respectively, and the side walls 65a–65d are displaced horizontally inwards. In this manner, the amount of fuel storable in the fuel tank 64 gradually increases. The amount of deformation of the upper and lower walls 66, 67 is normally greater than the amount of deformation of the side walls 65a–65d.

Figure 17:
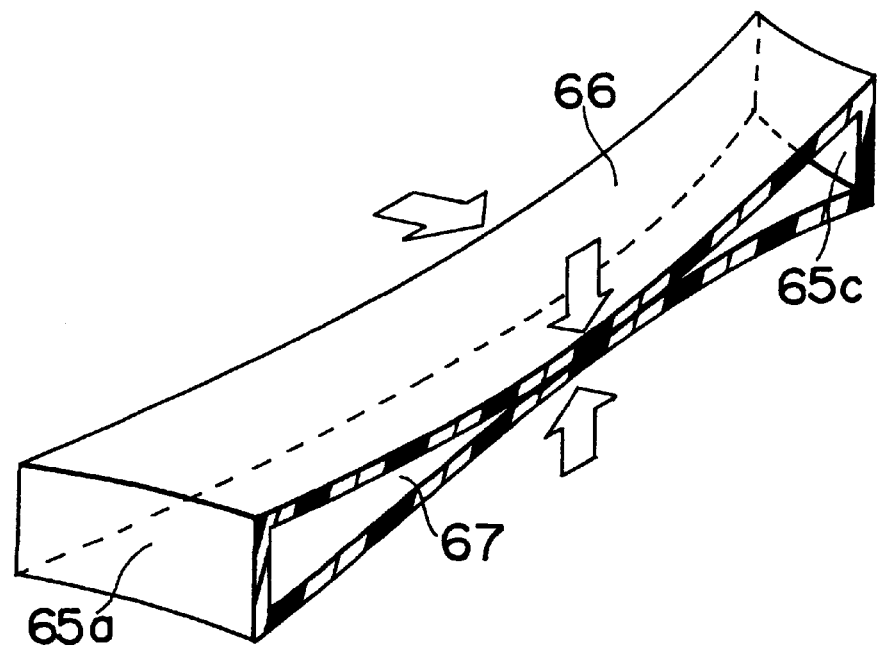
FIG. 17 is a sectional view of the fuel tank when the amount of fuel contained in the fuel tank is less than a predetermined amount.

Conversely, as shown in FIG. 17, when fuel flows out of the fuel tank 64 so that the amount of fuel remaining in the fuel tank 6 becomes less than the predetermined amount, the upper and lower walls 66, 67 curve or dent inwards so as to come closer to each other, and the side walls 65a–65d curve or dent inwards so as to come closer to each other. That is, in the eighth embodiment, if the amount of fuel in the fuel tank 64 becomes less than the predetermined amount, the upper wall 66 and the lower wall 67 are displaced downwards and upwards, respectively, and the side walls 65a–65d are displaced horizontally inwards. In this manner, the walls of the fuel tank 64 are displaced in different directions, and the amount of fuel storable in the fuel tank 64 gradually decreases.

Referring back to FIG. 13, an opening 69 is formed in the upper portion 60 of the housing 62. A charcoal canister 70 is connected to the opening 69. The charcoal canister 70 contains activated carbon 71. Two spaces are defined on opposite sides of the activated carbon 71. One of the spaces communicates with the atmosphere, and the other space communicates with a purge pipe 73 for introducing fuel vapor from the charcoal canister 70 and a fuel supply pipe 72 into an intake passage 36. Therefore, the air chamber 68 communicates with the atmosphere via the charcoal canister 70. As a result, if the upper wall 66 and the lower wall 67 of the fuel tank 64 are displaced away from each other, that is, outwards, air flows out of the air chamber 68 into the external air via a filter disposed in the charcoal canister 70. If the upper wall 66 and the lower wall 67 of the fuel tank 64 are displaced inwards, air flows into the air chamber 68 via the filter of the charcoal canister 70. Thus, the opening 69 facilitates displacement of the upper wall 66 and the lower wall 67 of the fuel tank 64 inside the housing 62. The purge pipe 73 is provided with a purge control valve 87 that is opened by an ECU 3 when fuel vapor needs to be flowed into the intake passage 36. A throttle valve 47 is disposed in the intake passage 36. The purge pipe 73 is connected to a portion of the intake passage 36 that extends downstream of the throttle valve 47.

The fuel supply pipe 72 for supplying fuel into the fuel tank 64 is connected at its lower end 74 to a substantially central portion of the lower wall 67 of the fuel tank 64 via a stretchable pipe 75. The stretchable pipe 75 has a bellows-shaped pipe wall whose sectional shape is wavy. Therefore, the stretchable pipe 75 shrinks if the amount of fuel in the fuel tank 64 increases and the lower wall 67 is displaced downwards. If the amount of fuel in the fuel tank 64 decreases and the lower wall 67 is displaced upwards, the stretchable pipe 75 stretches. A cap 9 for closing the fuel supply pipe 72 is removably connected to an upper end 76 of the fuel supply pipe 72. When fuel is to be supplied into the fuel tank 64, the cap 9 is removed, and then fuel is supplied via the opening of the upper end 76 of the fuel supply pipe 72.

A fuel introducing pipe 78 for introducing fuel from the fuel tank 64 into a fuel pump chamber 77 is connected at one end thereof to an intermediate portion of the fuel supply pipe 72. The fuel pump chamber 77 corresponds to the auxiliary fuel chamber 13 in the first embodiment. The other end of the fuel introducing pipe 78 is connected to the fuel pump chamber 77. A fuel pump 15 is disposed in the fuel pump chamber 77. Fuel is supplied from the fuel pump chamber 77 into an engine 19 by the fuel pump 15, via a fuel supplying pipe 79. A portion of the amount of fuel ejected from the fuel pump 15 is returned to the fuel pump chamber 77 via a fuel return passage 20. A heater 16 for heating fuel in the fuel pump chamber 77 and a stirrer 17 for stirring fuel in the fuel pump chamber 77 are disposed in the fuel pump chamber 77. Furthermore, a fuel vapor concentration sensor 95 for detecting the fuel vapor concentration in the fuel pump chamber 77 is disposed in the fuel pump chamber 77. The fuel vapor concentration sensor 95 is connected to the ECU 3, and sends thereto an output signal in accordance with the fuel vapor concentration in the fuel pump chamber 77. An exhaust passage 50 for discharging exhaust gas from the engine 19 into the atmosphere is connected to the engine 19.

A gas discharge pipe 80 for discharging gas from the fuel pump chamber 77 into the fuel supply pipe 72 is connected at one end thereof to the fuel pump chamber 77. The other end of the gas discharge pipe 80 is connected to the fuel supply pipe 72. The gas discharge pipe 80 is provided with a check valve 81 that is opened when the pressure in the fuel pump chamber 77 becomes higher than a predetermined positive pressure. When fuel is flowed from the fuel tank 64 into the fuel pump chamber 77, the pressure in the fuel pump chamber 77 becomes higher than the predetermined positive pressure, that is, the valve opening pressure of the check valve 81, so that gas is discharged from the fuel pump chamber 77 into the fuel supply pipe 72 via the gas discharge pipe 80. Therefore, the introduction of fuel into the fuel pump chamber 77 is facilitated.

A fuel vapor discharge pipe 82 for discharging gas, particularly, fuel vapor, out of the fuel tank 64 is connected at one end thereof to a substantially central portion of the upper wall 66 of the fuel tank 64. The other end of the fuel vapor discharge pipe 82 is connected to the fuel pump chamber 77. The fuel vapor discharge pipe 82 has such a flexibility as to follow the displacement of the upper wall 66 of the fuel tank 64. The fuel tank-side end of the fuel vapor discharge pipe 82 is connected to the fuel tank 64 via a second cutoff valve 88. The second cutoff valve 88 has a second float 89 that is floatable on a surface of liquid fuel. Therefore, when fuel vapor occurs in the fuel tank 64, the second float 89 descends to open the fuel vapor discharge pipe 82, so that fuel vapor is discharged from the fuel tank 64 into the fuel pump chamber 77 via the fuel vapor discharge pipe 82 due to the restoration force of the upper wall 66 and the lower wall 67 of the fuel tank 64. When the surface of liquid fuel in the fuel tank 64 reaches the second cutoff valve 88, the second float 89 ascends together with the surface of liquid fuel to close the opening of the fuel vapor discharge pipe 82, thereby shutting the fuel vapor discharge pipe 82. Therefore, fuel will not leak out of the fuel tank 64. Furthermore, the fuel tank 64 is closed after fuel vapor has been discharged out of the fuel tank 64, so that the second cutoff valve 88 remains closed unless fuel vapor occurs in the fuel tank 64. Hence, gas will not flow into the fuel tank 64, and occurrence of fuel vapor in the fuel tank 64 is prevented.

A fuel supply pipe fuel vapor discharging pipe 83 for introducing fuel vapor from the fuel supply pipe 72 into the purge pipe 73 is connected to an upper portion of the fuel supply pipe 72. The fuel supply pipe fuel vapor discharging pipe 83 is provided with a two-way valve 84. The two-way valve 84 has a positive pressure valve 85 that opens when the pressure in a charcoal canister-side portion of the fuel supply pipe fuel vapor discharging pipe 83 becomes higher than a predetermined positive pressure, and a negative pressure valve 86 that opens when the pressure in the charcoal canister-side portion of the fuel supply pipe fuel vapor discharging pipe 83 becomes lower than a predetermined negative pressure. The fuel supply pipe fuel vapor discharging pipe 83 is connected to the fuel supply pipe 72 via a first cutoff valve 93. The first cutoff valve 93 has a first float 94 that is floatable on the liquid surface of fuel. Therefore, when the surface of liquid fuel in the fuel supply pipe 72 ascends, the first float 94 ascends to close the opening of the fuel supply pipe fuel vapor discharging pipe 83, thereby shutting the fuel supply pipe fuel vapor discharging pipe 83. Therefore, fuel liquid will not flow into the fuel supply pipe fuel vapor discharging pipe 83.

A fuel gauge 91 is mounted to an internal wall surface of the upper portion 60 of the housing 62. The fuel gauge 91 has a metering arm 92 that contacts an external wall surface of a substantially central portion of the upper wall 66 of the fuel tank 64. Therefore, the end portion of the metering arm 92 contacting the upper wall 66 is displaced following the displacement of the upper wall 66. Based on the displacement of the end portion of the metering arm 92, the fuel gauge 91 detects the amount of fuel contained in the fuel tank 64. The fuel gauge 91 is connected to the ECU 3, and sends thereto an output signal in accordance with the amount of fuel present in the fuel tank 64.

The fuel vapor control in the eighth embodiment will be described. In the eighth embodiment, if the fuel vapor concentration in the fuel pump chamber 77 is lower than a predetermined concentration, the heater 16 is operated to heat fuel in the fuel pump chamber 77. When fuel in the fuel pump chamber 77 is heated, fuel vaporizes in the fuel pump chamber 77, and the pressure in the fuel pump chamber 77 increases. Therefore, the check valve 81 opens, so that fuel vapor and air are discharged from the fuel pump chamber 77 into the fuel supply pipe 72. As a result, the fuel vapor concentration in the fuel pump chamber 77 increases.

When the fuel vapor concentration in the fuel pump chamber 77 exceeds the predetermined concentration, the operation of the heater 16 is stopped, so that the temperature in the fuel pump chamber 77 decreases and the pressure in the fuel pump chamber 77 decreases. As a result, the check valve 81 closes, so that the fuel pump chamber 77 becomes closed. In this manner, air is substantially completely discharged from the fuel pump chamber 77 in the eighth embodiment. Thus, vaporization of fuel in the fuel tank is prevented, and the amount of fuel vapor that flows out of the fuel pump chamber is maintained at a low level. Hence, the total amount of fuel vapor that flows out of the fuel tank and the fuel pump chamber is maintained at a low level.

When the heater 16 is turned off after the fuel vapor concentration in the fuel pump chamber 77 has exceeded the predetermined concentration, the pressure in the fuel pump chamber 77 decreases. Thus, negative pressure is flowed into the second cutoff valve 88. That is, even if fuel vapor remains in the fuel tank 64, negative pressure is flowed into the fuel tank 64 via the second cutoff valve 88, so that fuel vapor is substantially eliminated from the fuel tank 64.

Figure 5:
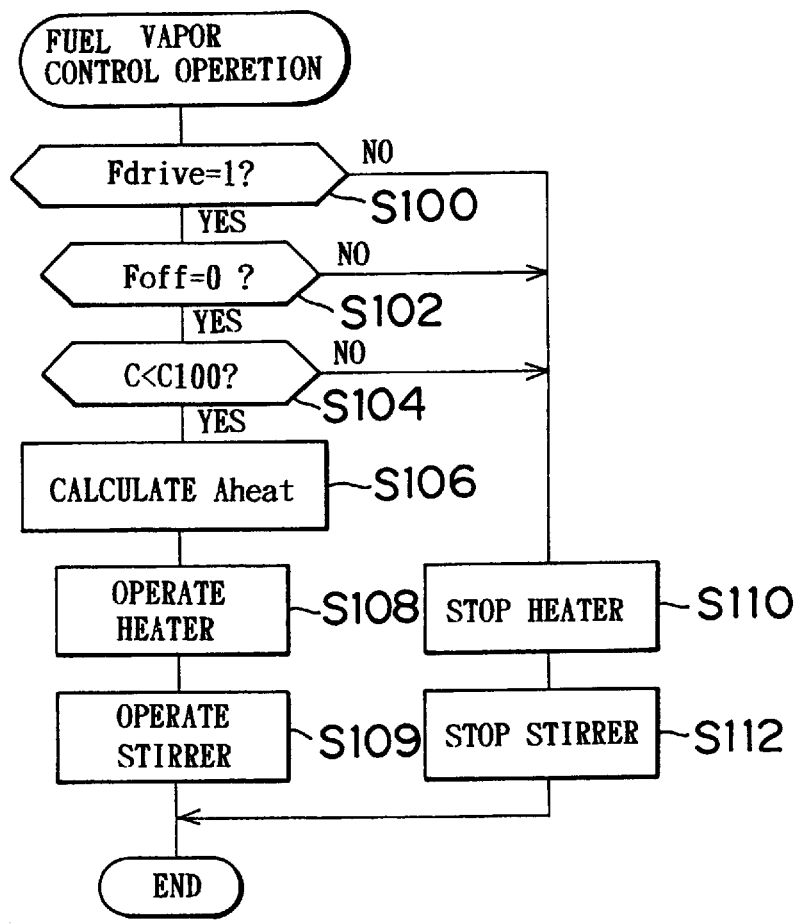
FIG. 5 is a flowchart illustrating a fuel vapor control operation in the first embodiment.

The fuel vapor control in the eighth embodiment is executed as illustrated in the flowchart of FIG. 5. This control operation is substantially the same as that in the first embodiment, and will not be described again. It is also possible to apply the fuel vapor control according to the second embodiment to the fuel vapor control apparatus of the eighth embodiment. It is also possible to replace the check valve with a two-way valve in the fuel vapor control apparatus of the eighth embodiment and apply thereto the fuel vapor control according to any one of the third to sixth embodiments. Furthermore, it is possible to replace the check valve with a control valve in the fuel vapor control apparatus of the eighth embodiment and apply thereto the fuel vapor control according to the seventh embodiment.

While the present invention has been described with reference to what are presently considered to be preferred embodiments thereof, it is to be understood that the invention is not limited to the disclosed embodiments or constructions. To the contrary, the invention is intended to cover various modifications and equivalent arrangements included within the spirit and scope of the invention.

What is claimed is:

1. A fuel vapor control apparatus comprising:
   a fuel tank;
   a detector that detects a quantity of state corresponding to a concentration of fuel vapor in a space defined above a surface of liquid fuel in the fuel tank;
   a fuel vapor concentration determining device that determines, based on the quantity of state, whether the concentration of fuel vapor is less than a predetermined concentration; and
   a fuel vapor concentration increasing device that increases the concentration of fuel vapor when the fuel vapor concentration determining device determines that the concentration of fuel vapor is less than the predetermined concentration.

2. A fuel vapor control apparatus according to claim 1, wherein the fuel vapor concentration increasing device stops increasing the concentration of fuel vapor when the fuel vapor concentration determining device determines that the concentration of fuel vapor exceeds the predetermined concentration.

3. A fuel vapor control apparatus according to claim 2, further comprising
   a connection state controller that controls a state of connection between an inside of the fuel tank and an outside of the fuel tank,
   wherein, when the fuel vapor concentration determining device determines that the concentration of fuel vapor is less than the predetermined concentration, the fuel vapor concentration increasing device increases the concentration of fuel vapor and causes air to flow from the inside of the fuel tank into the outside of the fuel tank via the connection state controller, and, when the fuel vapor concentration determining device determines that the concentration of fuel vapor exceeds the predetermined concentration, the fuel vapor concentration increasing device stops increasing the concentration of fuel vapor and stops air from flowing out of the fuel tank via the connection state controller.

4. A fuel vapor control apparatus according to claim 3, wherein the connection state controller establishes connection between the inside of the fuel tank and the outside of the fuel tank when a pressure in the fuel tank is higher than a predetermined pressure.

5. A fuel vapor control apparatus according to claim 1, further comprising:
   a connection state controller that controls a state of connection between an inside of the fuel tank and an outside of the fuel tank,
   wherein, when the fuel vapor concentration determining device determines that the concentration of fuel vapor is less than the predetermined concentration, the fuel vapor concentration increasing device increases the concentration of fuel vapor and causes air to flow from the inside of the fuel tank to the outside of the fuel tank via the connection state controller.

6. A fuel vapor control apparatus according to claim 5, wherein, when a pressure in the fuel tank is lower than a predetermined pressure, the connection state controller connects the inside of the fuel tank to the outside of the fuel tank, and
   wherein the detector detects a temperature in the fuel tank as a quantity of state corresponding to the concentration of fuel vapor, and
   wherein, when the temperature detected by the detector is lower than a predetermined temperature, the fuel vapor concentration determining device determines that the concentration of fuel vapor is less than the predetermined concentration.

7. A fuel vapor control apparatus according to claim 5, wherein in at least one of a case where a pressure in the fuel tank is lower than a predetermined first pressure and a case where the pressure in the fuel tank is higher than a predetermined second pressure that is higher than the first pressure, the connection state controller connects the inside of the fuel tank to the outside of the fuel tank, and
   wherein the detector detects the pressure in the fuel tank as a quantity of state corresponding to the concentration of fuel vapor, and
   wherein, when the pressure detected by the detector substantially equals one of the first pressure and the second pressure, the fuel vapor concentration determining device determines that the concentration of fuel vapor is less than the predetermined concentration.

8. A fuel vapor control apparatus according to claim 1, further comprising
   a temperature detector that detects a fuel tank temperature,
   wherein the fuel vapor concentration increasing device increases the concentration of fuel vapor only when the fuel tank temperature detected by the temperature detector is within a predetermined temperature range.

9. A fuel vapor control apparatus according to claim 1, further comprising
   a fuel amount detector that detects an amount of fuel in the fuel tank,
   wherein, when the amount of fuel detected by the fuel amount detector is less than a predetermined amount, the fuel vapor concentration increasing device increases the concentration of fuel vapor.

10. A fuel vapor control apparatus according to claim 1,
wherein the detector detects a pressure in the fuel tank as a quantity of state corresponding to the concentration of fuel vapor, and
wherein, when the pressure in the fuel tank detected by the detector is higher than a predetermined pressure, the fuel vapor concentration determining device determines that the concentration of fuel vapor is less than the predetermined concentration.

11. A fuel vapor control apparatus according to claim 1,
wherein the detector detects a fuel tank temperature as a quantity of state corresponding to the concentration of fuel vapor, and
wherein, when the fuel tank temperature detected by the detector is lower than a predetermined temperature, the fuel vapor concentration determining device determines that the concentration of fuel vapor is less than the predetermined concentration.

12. A fuel vapor control apparatus according to claim 1,
wherein the detector detects whether fuel has been supplied to the fuel tank as a quantity of state corresponding to the concentration of fuel vapor, and
wherein, when the detector detects that fuel has been supplied into the fuel tank, the fuel vapor concentration determining device determines that the concentration of fuel vapor is less than the predetermined concentration.

13. A fuel vapor control apparatus according to claim 1, wherein the fuel vapor concentration increasing device comprises a heater device that heats fuel in the fuel tank.

14. A fuel vapor control apparatus according to claim 13, wherein the fuel vapor concentration increasing device further comprises a stirrer that stirs fuel in the fuel tank to promote an increase in the concentration of fuel vapor.

15. A fuel vapor control apparatus according to claim 13, wherein the heater device heats only a portion of the fuel stored in the fuel tank.

16. A fuel vapor control apparatus according to claim 13, wherein the heater device comprises a fuel pump that supplies fuel from the fuel tank into an internal combustion engine.

17. A fuel vapor control apparatus according to claim 13, wherein the heater device comprises a fuel pump that supplies fuel from the fuel tank into an internal combustion engine and a fuel return passage for returning to the fuel tank fuel previously supplied to the internal combustion engine.

18. A fuel vapor control apparatus according to claim 13, wherein the heater device transfers heat from the internal combustion engine to the fuel.

19. A fuel vapor control apparatus according to claim 18, wherein the heater device comprises an exhaust passage for discharging exhaust gas from the internal combustion engine.

20. A fuel vapor control apparatus according to claim 1, further comprising a fuel vapor supply passage for supplying fuel vapor from the fuel tank to an internal combustion engine.

21. A fuel vapor control apparatus according to claim 20, further comprising a canister that temporarily retains fuel vapor that has flown out of the fuel tank into the fuel vapor supply passage.

* * * * *